United States Patent
Gamliel et al.

(10) Patent No.: US 10,775,266 B2
(45) Date of Patent: Sep. 15, 2020

(54) METHODS AND SYSTEMS FOR TESTING OF EYEGLASSES

(71) Applicant: SHAMIR OPTICAL INDUSTRY LTD., Upper Galilee (IL)

(72) Inventors: Avihu Meir Gamliel, Pardes-Hana (IL); Zohar Katzman, Haifa (IL); Amos Netzer, Kibbutz Ramat-Yohanan (IL); Yotam Gil, Kiryat Tiv'on (IL); Meirav Metzger Moshe, Kibbutz Ramat-Yohanan (IL); Shai Michael, Kibbutz Ramat-Yohanan (IL)

(73) Assignee: SHAMIR OPTICAL INDUSTRY LTD, Upper Galilee (IL)

( * ) Notice: Subject to any disclaimer, the term of this patent is extended or adjusted under 35 U.S.C. 154(b) by 0 days.

(21) Appl. No.: 16/077,646

(22) PCT Filed: Feb. 12, 2017

(86) PCT No.: PCT/IL2017/050178
§ 371 (c)(1),
(2) Date: Aug. 13, 2018

(87) PCT Pub. No.: WO2017/138004
PCT Pub. Date: Aug. 17, 2017

(65) Prior Publication Data
US 2019/0049336 A1 Feb. 14, 2019
US 2019/0391040 A2 Dec. 26, 2019

Related U.S. Application Data

(60) Provisional application No. 62/310,825, filed on Mar. 21, 2016, provisional application No. 62/294,322, filed on Feb. 12, 2016.

(51) Int. Cl.
G01M 11/02 (2006.01)

(52) U.S. Cl.
CPC ...... *G01M 11/0257* (2013.01); *G01M 11/025* (2013.01); *G01M 11/0214* (2013.01); *G01M 11/0235* (2013.01); *G01M 11/0278* (2013.01)

(58) Field of Classification Search
CPC ......... G01M 11/0257; G01M 11/0214; G01M 11/0235; G01M 11/025; G01M 11/0264; G01M 11/0278
(Continued)

(56) References Cited

U.S. PATENT DOCUMENTS 1,803,473 A 5/1931 Johnston
4,545,678 A 10/1985 Grimm et al.
(Continued)

FOREIGN PATENT DOCUMENTS

WO 2009/007731 A1 1/2009

OTHER PUBLICATIONS

ISO 8980-3 (2013) International Standard,Third edition, Ophthalmic optics—Uncut finished spectacle lenses—Part 3: Transmittance specifications and test methods.

*Primary Examiner* — Isiaka O Akanbi
(74) *Attorney, Agent, or Firm* — Browdy and Neimark, PLLC

(57) ABSTRACT

A methods and system for testing of eyeglasses using a background object are disclosed. The method includes obtaining an image of a background object, whereby in at least a part of the image the background object is captured as viewed through a lens of a pair of eyeglasses, and analyzing at least a part of the image showing the background object being captured through a lens of the eyeglasses, and identifying a property of the lens based on the analyzing.

20 Claims, 13 Drawing Sheets

(58) Field of Classification Search
USPC .............. 356/124–125, 446, 429, 601, 437
See application file for complete search history.

(56) References Cited

U.S. PATENT DOCUMENTS

| | | | |
|---|---|---|---|
| 5,231,460 A * | 7/1993 | Kohayakawa | G01M 11/0235 |
| | | | 356/125 |
| 5,247,341 A * | 9/1993 | Kurachi | G01M 11/0235 |
| | | | 356/125 |
| 5,307,141 A | 4/1994 | Masano | |
| 5,617,155 A | 4/1997 | Ducarouge | |
| 2007/0160307 A1 * | 7/2007 | Steinberg | H04N 5/232 |
| | | | 382/254 |
| 2007/0226076 A1 | 9/2007 | Fukuma et al. | |
| 2008/0111989 A1 | 5/2008 | Dufour et al. | |
| 2013/0293726 A1 | 11/2013 | Armstrong-Muntner et al. | |
| 2015/0055085 A1 * | 2/2015 | Fonte | G06F 16/22 |
| | | | 351/178 |
| 2015/0109613 A1 | 4/2015 | Bull et al. | |
| 2016/0128566 A1 * | 5/2016 | Durr | A61B 3/1015 |
| | | | 351/206 |

* cited by examiner

METHODS AND SYSTEMS FOR TESTING OF EYEGLASSES

TECHNOLOGICAL FIELD

The present invention relates to methods and systems for testing of eyeglasses.

BACKGROUND

In recent years, visual health and protection from harmful light accounts for a growing share of the research and innovation efforts by manufacturers of lenses for use in eyewear.

Indeed, today, lenses may be manufactured with a wide variety of features such as filters or protective layers for protection against UV (Ultraviolet) light, HEV (High-Energy Visible) light, etc.

However, the tools currently available for detecting the presence of features such as filters or layers on lenses are limited to professional equipment which is usually adapted for use in an industrial setting (e.g. designed for being operated by a QA Engineer or an optical technician), and are not readily available for most eyeglass wearers.

Further, the professional equipment often requires complex operation by a professional worker, particularly in as far as analyzing measurements taken using such tools is concerned.

Consequently, with the growing variety of filters and layers that may be applied to lenses in use on eyewear like sunglasses or other eyeglasses, a person who purchases eyeglasses has to rely on information received from a seller or manufacturer (if available).

Customers have no way to independently detect or verify 5 the presence of features like specific filters or protective layers on the lenses installed on the eyeglasses they purchased.

GENERAL DESCRIPTION

The present invention provides methods and systems (apparatus) for testing of eyeglasses using a background object.

Lenses in modern eyeglasses have a variety of properties which may be selected to best fit the different needs of individual user of eyeglasses, say different filters or protective layers—for protection against UV (Ultraviolet) light or HEV (High-Energy Visible) light, or other features, as known in the art.

However, the tools currently available for detecting the presence of features such as filters or layers on lenses are limited to professional tools for use (say by 10 optical technicians) in an industrial environment, and are not available for most users of eyeglasses.

Consequently, with a growing variety of filters and layers that may be applied to lenses in use on eyewear such as sunglasses or other eyeglasses, a person who purchases eyeglasses has to rely on information received from a seller or manufacturer, and has no way to verity the information.

According various embodiments of the present invention, there is provided a method of testing of eyeglasses using a background object, which may also serve an individual user. The method provides for determining/estimating at least one property of the lens(s) of the eyeglasses, such as coating/filter type found on in the lens, and/or defects such as scratches cracks and/or peelings associated blurriness of the lens. The method can be performed in-situ, by the end user, and by conventional general purpose equipment such as smart mobile devices that are typically available to the end user and used for various other purposes.

Thus according to a first broad aspect of the present invention there is provided a method for determining parameters of eyeglasses lens. The method include: obtaining an image of a background object, whereby in at least a part of the image at least a part of the background object is captured as viewed through a lens of a pair of eyeglasses; and analyzing said at least a part of the image to identifying a property of the lens.

The analyzing comprises comparing two parts of the background object as captured in the image, only one of the two parts being a part captured through the lens.

The analyzing may be adapted for analyzing a color characteristic of the image. The property of the lens which is to be determined may be at least one of the group consisting of having a predefined coating and having a predefined filter.

In some embodiments of the present invention the lens property, which is being estimated/determined pertains a driving compatibility of the lens. In some embodiments the lens property which is being estimated/determined pertains to a color of the lens. In some embodiments the lens property which is being estimated/determined pertains to the opacity of the lens.

According to various embodiments of the present invention the method also includes identifying an assembly quality of the eyeglasses based on the analysis.

According to various embodiments of the present invention the method (the analyzing) includes comparing sharpness between two parts of the background object as captured in the image, only one of the two parts being a part captured through the lens.

According to various embodiments of the present invention the method (the analyzing) includes comparing a color characteristic between two parts of the background object as captured in the image, only one of the two parts being a part captured through the lens.

According to various embodiments of the present invention the method (the analyzing) includes identifying a predefined deformation along a segment within the background object as captured in the image.

According to various embodiments of the present invention the method includes optimizing color selection for at least a part of the background object according to technical characteristics of an image capture device (e.g. the white balance thereof) intended to be used for capturing the image, a device intended to be used for presenting the background object, or of both of the devices.

In some embodiments a predetermined/defined reference object (i.e. object) is used in the method.

In some cases the reference/background object includes a plurality of parts, each part having a respective, predefined color and a respective, predefined position within the background object. To this end the analyzing of the image of the reference object may be based on the respective predefined color and position of at least one of the parts. In some embodiments, the background object include a plurality of parts arranged around a center of the background object, each part having a respective, predefined color and a respective, predefined order of placement around the center. The analyzing of such object may be based on the respective predefined order of placement and color of at least one of the parts.

In some embodiments the method further includes using a predefined marking appearing on the background object, for automatically identifying an orientation of the background object as captured in the image. For instance the method may include using a directional aspect of a texture of the background object as captured in the image, for automatically identifying an orientation of the background object as captured in the image. Alternatively or additionally the method may further include identifying alignment of the background object as captured in the image in a predefined orientation, and automatically initiating the analyzing upon the identifying of the alignment in the predefined orientation. Yet alternatively or additionally, the method may further include identifying alignment of the background object as captured in the image, and using the identified alignment for guiding a user in aligning the pair of eyeglasses and an image capture device used to capture the image with respect to each other. Yet in some embodiments the method includes locating a facial feature in the capture image, and using the located facial feature for guiding a user in aligning the pair of eyeglasses and an image capture device used to capture the image with respect to each other.

According to some embodiments the method of the present invention includes locating a boundary (edge) of the lens in the image. In some cases the located boundary/edge is used for guiding a user in aligning the pair of eyeglasses and an image capture device used to capture the image with respect to each other. In some embodiments (e.g. particularly when the reference object is a virtual object presented on a screen), the method includes utilizing the located boundary for verifying the appearance of the background object on the screen such that background object as captured in the image extends over two sides of the boundary According to some embodiments, the method further includes automatically estimating a location of a center of the lens of the eyeglasses in the image. Then the estimate center location may be used for guiding a user in aligning the pair of eyeglasses and an image capture device used to capture the image with respect to each other.

According to yet another broad aspect of the present invention there is provided a system/apparatus for testing of eyeglasses using a background object. The system includes:
  a reference object image provider module configured and operable for obtaining an image of a background object, whereby in at least a pat of the image at least a part of the background object is captured as viewed through a lens of a pair of eyeglasses;
  an image analyzer configured to analyze an image of a background object to determine at least said part of the image in which at least said part of the background object being captured in the image as viewed through the lens of the eyeglasses; and
  a property identifier, in communication with the image analyzer, configured to identify a property of the lens based on the analyzed image.

According to yet another broad aspect of the present invention there is provided a non-transitory computer readable medium storing computer executable instructions for performing steps of testing of eyeglasses using a background object, the steps include:
  obtaining an image of a background object, whereby in at least a part of the image at least a part of the background object is captured as viewed through a lens of a pair of eyeglasses; and
  analyzing said at least a part of the image and identifying a property of the lens based on the analyzing.

Optionally according to some embodiments of the present invention the method is implemented on a mobile device such as smart phone (e.g. an Apple iPhone® or a Samsung Galaxy® Smart Phone), Tablet Computer, etc.—i.e. using devices available to any user nowadays, as described in further detail hereinbelow.

Consequently, a user may be able to test his eyeglasses and measure/estimate properties of their lenses without professional tools of the sort used in industrial environments or the help of a technician or engineer, say at the user's home or office.

The method may help the user figure out, for example, if the lenses in the user's eyeglasses have a HEV (High-Energy Visible) light protective layer, an AR (Anti-reflection) coating, etc., or another property, as described in further detail hereinbelow.

According to an exemplary embodiment of the present invention, there is analyzed an image which captures a background object, such that at least a part of the background object is captured in the image through a lens of a pair of eyeglasses.

Then, based on the analysis of the image, there is identified one or more properties of the lens, as described in further detail hereinbelow.

In one example, the background object is a predefined pattern presented on a screen (say a computer screen), say a radial pattern made of several slices arranged around the person's center, as described in further detail hereinbelow.

In the example, the pair of eyeglasses may be placed on a surface, say on a desktop, in a position opposite the computer screen on which the predefined pattern is presented, such that at least a part of the background object may be viewed through one of the eyeglasses' lenses.

Next, an image of the background object in which at least a part of the object is viewed through the lens (and typically another part is viewed not through the lens) is captured, by a system of the present invention which may be incorporated/integrated with a device (e.g. a smart mobile device) of the user. The system may be implemented for example in an application (say an iPhone® App) downloadable to a user's mobile smart phone. The system may be adapted to utilize/operate the imager/cameral module of the mobile device of the user for capturing the image of the background object. The image may be captured when the user pushes a certain button on his smart mobile device/phone, or rather automatically upon alignment of the phone's camera and lens in a predefined orientation with respect to each other, as described in further detail hereinbelow.

In the image of the example, the lens covers only a part of the background object. Consequently, only a part of the background object is captured through the lens, and the remaining part of the background object is captured directly—i.e. not through the lens, as described in further detail hereinbelow, and as illustrated, for example, in FIG. 9.

Subsequently, the image is analyzed, say through one or more comparisons made between the background object's part that is captured in the image through the lens and the background object's part that is captured in the image, but not through the lens.

Finally, based on the analysis of the image, there may be identified a property of the lens. For instance spectral filtering properties of the lens can be determined (e.g. the presence of a feature such as a filter or a layer for protection against UV (Ultraviolet) light or HEV (High-Energy Visible) light), driving compatibility of the lens distortions/defects related to the presence of defects as scratches, peeling, cracks, etc.—on the lens.

BRIEF DESCRIPTION OF THE DRAWINGS

The invention is herein described, by way of example only, with reference to the accompanying drawings. With specific reference made to the drawings in detail, it is stressed that the particulars shown are by way of example and for purposes of illustrative discussion of certain embodiments of the present invention only, and are presented in order to provide what is believed to be a useful and readily understood description of the principles and conceptual aspects of the invention. The description taken with the drawings making apparent to those skilled in the art how the several forms of the invention may be embodied in practice.

In the drawings.

DETAILED DESCRIPTION

Figure 1A:
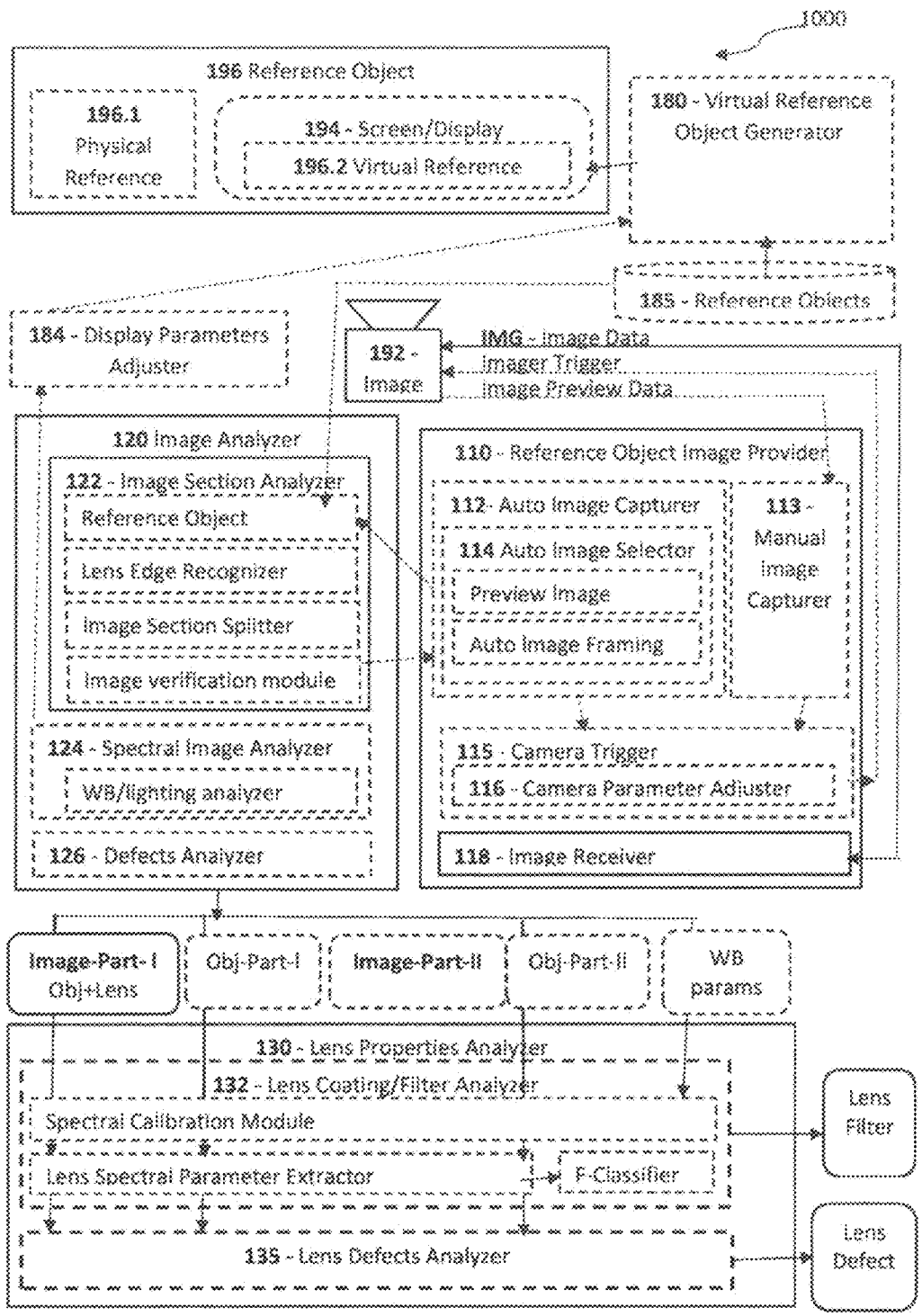
FIG. 1A is a block diagram schematically illustrating a first exemplary apparatus for testing of eyeglasses using a background object, according to an exemplary embodiment of the present invention.

The principles and operation of the system (apparatus), method, and/or a computer readable software product, implementing the present invention, may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1A, which is a block diagram schematically illustrating a first exemplary system 1000 for testing of eyeglasses according to some embodiments of the present invention by utilizing a background object.

System 1000 includes a Reference Object Image Provider module 110 (also referred to herein as image capturer) configured and operable for providing/capturing one or more stills or video images of a background object, an image analyzer module 120 being in communication with the image capturer 110, and configured and operable for analyzing the image provided by the image capturer 110, and Lens Properties Analyzer 130 (also referred to herein as property identifier) in communication with the image analyzer 120, and configured and operable for determining/estimating one or more properties of the lens installed on the eyeglasses based on the analysis of the image by the image analyzer 120.

The image capturer (namely the reference object image provider module) 110 is connectable to an imager 192 (e.g. a camera or other image capturing device), and is adapted to acquire from the imager 192 an image of the reference object 196.

In some embodiments the image capturer 110 includes a manual and/or auto image capture modules, 112 and/or 113 respectively, which are configured and operable for receiving operational instructions (input/signals) from the user of the system for capturing an image of the reference object 196. The image capturer 110 also includes a camera trigger module 115 (e.g. camera driver/operation utility) which is connectable to the camera/imager 192 and configured and operable for issuing operational instructions/data for activating the camera to capture images. To this end, upon receiving instructions from the user, the manual—and/or auto—image capture modules, 112 and/or 113, operate the camera trigger module 115 to trigger the camera 196 into operation. The image capturer 110 further includes an image receiver module 118 connectable to the camera 192 and adapted to receive images captured thereby. Accordingly, once the camera 192 is triggered the image receiver module 118 obtains the image captured by the camera.

In some implementations for camera trigger module 115 includes a Camera Parameter Adjuster 116 (e.g. auto white-balance tuner, flash disabler/enabler or other) which is configured and operable for adjusting the camera parameters before the image is captured. The operation of the a Camera Parameter Adjuster 116 and its use for the subject matter of the present invention will be discussed in mode details below, in relation to the configurations and operations of the spectral image analyzer 124 and/or scratch/defects analyzer 126 sub-modules of the image analyzer 120.

In some embodiments, the image capturer 110 is adapted to naively obtain the image that is captured by the camera. To this end, the manual image capture module 113, operates upon the user input to trigger the camera operation.

However, in some embodiments the image capturer 110 is configured and operable for providing only images that fulfil certain prerequisites suitable for the determination of the attributes/properties of the eyeglasses lens. To this end, typically in some embodiments of the present invention the image capturer 110 includes an auto image capture module 112 that is configured and operable to obtain an image of the reference object that satisfies certain prerequisites.

For example in some embodiments the auto image capture module 112 verifies that the captured image satisfies such the prerequisite that the image includes tow image part showing two respective parts of the reference object— whereby the two parts include:
(i) a first part of the image shows a respective part of the reference object as viewed/captured through a lens of the eye glasses; and
(ii) another/second image part shows a respective part of the reference object as viewed/captured directly (namely herein the phrases captured/viewed directly should be understood as being viewed/captured not through the lens of the eyeglasses).

To achieve that the auto image capture module 112 includes and auto image selector module 114 that is configured and operable for receiving consecutive preview images from the camera 196 (e.g. by utilizing a Preview Image retriever module connected to the camera). Upon receiving the image capturing instruction from the user, the auto image capture module 112 operates the image selector module 114 to retrieve and process preview images from the camera. The image selector module 114 (e.g. utilizing an Auto Image Framing module thereof) processes the preview images to determine a preview image satisfying the required prerequisites as indicated above. in some embodiments the image selector module 114 (e.g. utilizing an Auto Image Framing module thereof) is connectable to the image analyzer module and is adapted to provide the preview image(s) to image analyze module 120 to determine whether the appearance of the reference object 196 in the preview image satisfies the required prerequisite. The operation of the image analyzer module 120 in this regards is discussed in further detail with respect to the image section analyzer 122 sub-module of the image analyzer module 120. Once a suitable preview image is identified, fulfilling all the required prerequisites, auto image capture module 112 operates the camera trigger module to receive the image from the camera.

Turning now to the Image Analyzer 120 Analyzer 120, the Image Analyzer 120 is adapted to process the image provided by the image capturer 110 to determine/extract several parameters of the image from which the properties, particularly filtration properties, of the lens of the eyeglasses can be determined.

As indicate above, in some embodiments of the present invention, the properties of the eyeglasses lens are determined by comparing the first and second parts of the image (the first showing a portion of reference object through the eyeglasses lens, and the second showing a portion of reference object viewed directly). To this end, in some embodiments the Image Analyzer 120 includes an image section analyzer module 122 that is configured and operable for processing the image obtained by the image capturer 110 to extract/segment the image into the first and second image parts indicated above (one showing part of the reference object through the eyeglasses lens, and the second showing a part of the reference object viewed directly).

In some embodiments, the image section analyzer module 122 includes a Reference Object Recognizer module which is configured and operable to identify the appearance of the reference object in the image. To this end, in embodiments in which the reference object is a predefined object registered in data-storage/memory 185 (reference object(s) DB), the Reference Object Recognizer module may include/utilize pattern recognition tools (e.g. neural network based or other) to identify/recognize the appearance and location of the reference object in the image based on the information (visual data) of the reference object that is stored in the reference object(s) DB 185. Alternatively, in cases where the reference object is not predefined (is arbitrary), the Reference Object Recognizer module may employ pattern recognition tools to identify the largest/most homogeneous object that appears in the image in part through the eyeglasses lens and in part directly.

Upon recognizing the reference object in the image the image section analyzer module 122 crops the image to the extent of only the parts in which the reference object is shown and then segments the cropped image to two parts: the first showing the reference object through the lens and the second not through the lens. The image section analyzer module 122 may optionally include specifically adjusted edge detection module, referred to herein as Lens Edge Recognizer, which is configured and operable to identify lens edges in the image. The Lens Edge Recognizer may be operable with similar edge detection techniques generally known in the art, or other pattern recognition techniques, by tuning/configuring such techniques to the detection of the edges/frame of the eye glasses and/or for detection of edges of the lens itself (e.g. in the case of rimless frameless eyeglasses frames) glasses). Then upon detection the image parts showing the reference object through the lens and directly, the image section analyzer module 122 (e.g. the image section splitter sub-module thereof) segments the cropped image in to the first and second parts of the image IMG as follows:
Image-Part-I in which a first part of the reference object 196 appears through the lens; and
Image-Part-II in which a second part of the reference object 196 appears directly (not through lens).

The image analyzer 120 also includes an image verification module that is configured and operable to process the reference image IMG, particularly the image parts Image-Part-I and Image-Part-II thereof to determine whether a sufficient portion of the reference object 196 is captured in each of the image parts. To this end, a sufficient portion is considered to be a portion of the reference object which is large enough or diverse enough in the content of the reference object appears therein to allow reliable analysis and estimation of the properties of the lens. For instance, in case the reference object is a pattern (e.g. repetitive), the image verification module may be adapted to verify that each of the image parts show at least one section of the background object (e.g. unit-cell/tile of the pattern thereof). In case the reference object should present a certain diversity/number of different colors, the image verification module may be adapted to verify that each of the image parts show at least the required number/diversity of the colors.

In this regards, as will be apparent from the description below, the diversity of colors in the reference object may be used to assess the spectral/chromatic filtration properties in the lens. In this connection, the specific technique for assessing whether the image parts Image-Part-I and Image-Part-II are suitable for further processing of the required lens' properties, may generally depend on the type of the reference object used and the type of properties. Such data may be for example stored in the reference object data-base 185, to associated each reference object with the types of lens properties for which it can be use, and the kind of test to be conducted by the an image verification module to determine whether image parts Image-Part-I and Image-Part-II capture sufficient parts/portions of the reference object for determining the lens properties.

Accordingly, based on the required lens properties, which are to be analyzed (e.g. the spectral filtration properties of the lens the image verification module determines whether the captured image parts Image-Part-I and Image-Part-II are suitable and sufficient.

As indicted above, in some embodiments the image section analyzer 122 if operated first on a preview image obtained from the auto image selector 114, and once determining the preview image is suitable, provides instructions data/signals to the auto image capturer 112 to grab the preview image (e.g. with higher resolution) for further processing.

Additionally or alternatively, the image section Analyzer may operate on the full resolution image IMG to determine that it is suitable or not and to segment it to the first and second parts Image-Part-I and Image-Part-II as discussed above.

System 1000 also includes a lens properties analyzer module 130 which is adapted to process the first and second parts Image-Part-I and Image-Part-II obtained by the image analyzer module 120 to identify/estimate one or more properties of the lens.

To this end, as illustrated in the figure, the lens properties analyzer module 130 is adapted to receive data indicative of the first and second parts Image-Part-I and Image-Part-II from the image analyzer module 120. Optionally, the lens properties analyzer module 130 also received from the image analyzer module 120 data indicative of a first and second parts Obj-Part-I and Obj-Part-II of the reference object 196 which corresponds to the visible parts of the object 196 in Image-Part-I and Image-Part-II. The first and second parts Obj-Part-I and Obj-Part-II of the reference object 196 may be extracted by the reference object recognizer module (being the sub-module of the image section analyzer discussed above) from the reference data in the data base 185, by analyzing/recognizing the parts of the object 196 visible in the Image-Part-I and Image-Part-II.

The lens properties analyzer module 130 is configured and operable to compare the appearance of the reference object on the first and second parts of the image Image-Part-I and Image-Part-II, and thereby generate data/signals indicative of one or more properties of the lens. The lens properties data is determined based on the differences between the appearance of the relevant parts Obj-Part-I and Obj-Part-II of the reference object in the image parts Image-Part-I and Image-Part-II in which the reference object is viewed through the lens and directly respectively.

In various embodiments of the present invention the properties of the lens which are estimated include any of the following or both:
  (i) Spectral filtration properties of the lens (e.g. filtration properties of the lens itself—inherent to the lens material(s), and/or filtration properties associated with lens coatings), and/or
  (ii) Defects, such as scratch/peeling of the lens.

In embodiments where the lens properties analyzer module 130 is configured and operable for determining the spectral filtration properties of the lens, it includes a Lens coating/filter analyzer module 132. The Lens coating/filter analyzer module 132 is configured and operable for processing the image parts Image-Part-I and Image-Part-II, to determine the spectral content/profile of similar segments of the reference object appearing in those parts. The Lens coating/filter analyzer module 132 includes a Lens Spectral Parameter Extractor sub module which determines/estimates spectral properties of the lens. To this end the Spectral Parameter Extractor sub module may utilize the data about the relevant parts Obj-Part-I and Obj-Part-II of the object appearing in the Image-Part-I and Image-Part-II to identify on those image parts sections pertaining to similar segments of the reference object 196. The spectral content/profiles may be for example the average intensity values of the primary colors (e.g. of RGB or other pallet) extracted from the similar parts of the reference object appearing in the first and second image parts Image-Part-I and Image-Part-II. Then the difference (referred to hereinafter also as spectral difference profile) between the first and spectral profiles of respectively the first and second image parts Image-Part-I and Image-Part-II, is determined/calculated. This spectral difference actually represents the degree of attenuation of light of different colors through the lens. Accordingly filtration properties of the lens are identified/extracted by the Lens coating/filter analyzer module 132. This data may then be presented to the user as a result of the lens test carried by the system.

In some embodiments the Lens coating/filter analyzer module 132 also includes a filter classifier module (F-Classifier in the figure) which is configured and operable to process the spectral difference profile to determine/classify the profile to any one or more of know/conventional filters used in lenses and/or to identify it as unique filter. To this end the F-Classifier may include or be associated with datastorage storing the spectral attenuation parameters of one or more (typically plurality) of conventional lens filters/coatings. The F-Classifier may determine whether there is a match between the spectral difference profile and the spectral attenuation profiles of one (or possibly more—combination of several) known lens filter and upon determining a match—identifying that the lens is associated with such one (or combination) of filters. This data may then be presented to the user as a result of the lens test carried by the system.

Thus, as described above in order to determine filtration properties of the lens, the spectral content of the first and second parts of the image, Image-Part-I and Image-Part-II, are compared so as to identify difference(s) between the spectral content of the reference object viewed through the lens and directly, and thereby estimate the spectral parameters of the filter/coating provided by the lens. However, the inventors have noted that in some cases an non-balanced spectral content of the image IMG captured by the imager 192, may distorted/affect the result of such analysis. For instance, such non balanced spectral content may be as a result of purely tuned white balance (WB) operational parameter of the imager 192, or due to deviation of the ambient lighting of the environment at which the reference object is captured from the "neutral" white light (e.g. or parley tuned WB/"temperature" setting of the display screen 194, by which the reference object 196 may be presented. This may be performed for example by a display parameters adjuster module 184 (e.g. display driver/controller) which may be included in the system 1000 of the present invention and configured and operable for adjusting parameters of the display 194. In the following for clarity, any/all of these effects are referred to as the un-balanced WB parameters of the image IMG.

Therefore, in some embodiments there is a need to identify the un-balanced WB parameters of the image IMG and to be able to compensate for them, before performing analysis of the spectral filtration parameters of the lens. To achieve that the system 1000 (the image analyzer 122) may include a spectral image analyzer module 124 configured and operable to identify the un-balanced WB parameters of the image IMG (indicated WB params in the figured). In some implementations the spectral image analyzer module 124 receives the spectrally balanced imagery data of the reference object from the reference object DB 185 (which may store such data about any reference object stored thereby) and compares that with the spectral information from the second part of the image, Image-Part-II (which is captured directly—not through the lens). Then the un-balanced WB parameters of the image IMG are determined in accordance with the deviation between the portions of the spectrally balanced imagery data and the spectral information of the Image-Part-II which pertain to the similar region of the reference object 196. Alternatively or additionally, the un-balanced WB parameters of the image IMG can be determined by processing the image spectrum to classifying the image IMG to any of one or more conventional ambient lighting scenarios (e.g. based on conventional light temperature classifications: Warm Light e.g. Tungsten Lamp, White Light e.g. day light, Cold Light, e.g. Screen/Blue light, etc.), and/or in case the reference object is presented on screen 194, utilizing input data indicative of the operation light temperature parameter of the screen 194 by which the reference object displayed.

To this end, in some embodiments the Lens coating/filter analyzer module 132 also includes a spectral calibration module which is configured and operable for receiving the un-balanced WB parameters (WB params) from the spectral image analyzer module 124 and calibrate/adjust the colors of the image IMG (e.g. apply similar color adjustment to both image parts Image-Part-I and Image-Part-II) in accordance with the WB params so as to compensate the effects of the un-balanced WB parameters (e.g. in such manner the WB in the second image part Image-Part-II should be optimally neutralized or at least partially compensated). In such embodiments the operations described above with reference to the Lens Spectral Parameter Extractor are performed only after the un-balanced WB parameters are compensated for by the spectral calibration module.

In embodiments where the lens properties analyzer module 130 is configured and operable for determining the defects, such as scratches, peelings and/or cracks in the lens, it includes a Lens defects analyzer module 135. The Lens defects analyzer module 135 is configured and operable for processing the image parts Image-Part-I and possibly also Image-Part-II, to determine defects of the lens affecting the appearance of the reference object appearing in first part of the image Image-Part-I. The defects may include one or more scratches and/or peelings and/or cracks affecting blurriness of the reference object' part being viewed in the first part of the image Image-Part-I. Accordingly the Lens defects analyzer module 135 may be for example adapted to process the first and possibly second parts of the image to determine sharpness level of the first image part Image-Part-I and possibly also the second image part Image-Part-II and upon determining the sharpness level of the first image part Image-Part-I is below a certain sharpness threshold and/or optionally upon determining that the difference between the sharpness levels of the first and second image parts if above a certain threshold, issue/generate data indicative of the lens being defective. Sharpness level may be determined globally or locally according to any known in the art technique or other technique, for example by obtaining a spatial derivative(s) of each image part (e.g. Image-Part-I and possibly Image-Part-II) for which sharpness/blurriness degree should be estimated) and determining the sharpness degree based on the local and/or global average of the derivative of the respective image part (whereby higher average indicates sharper—less blurry image and vice-versa).

It should be noted that in some embodiment the reference object 196 is a physical object 196.1, while on some embodiments it may be virtual object 196.2 presented on display screen 194. To this end, in some embodiments the system includes a virtual reference generator module 180, connectable to a reference object database 185, and configured and operable for communicating (e.g. by wired or wireless communication) with the display screen 194 for presenting a selected reference object on the screen.

It should be noted that the apparatus/system 1000 for testing of eyeglasses using a background object, according to an exemplary embodiment of the present invention is implemented on a computer. The computer may actually be one or more computers, as described in further detail hereinbelow. Optionally, the computer may include a user's computer such as a mobile phone, a tablet computer, or another computer in use by a user, a computer in remote communication with the user's computer, etc., or any combination thereof, as described in further detail hereinbelow. Thus, optionally, all parts of the apparatus 1000 are implemented on the user's computer, say on a mobile phone, tablet computer, laptop computer, or other computer in use by the user, as described in further detail hereinbelow. Optionally, one or more of the apparatus 1000 parts (say one or more of the parts 110-130 shown in FIG. 1A) may be implemented at least in part, on a remote computer in communication with the user's computer, as described in further detail hereinbelow. The apparatus/system 1000 may include or be implemented for execution on at least one computer processor, say one or more computer processor of the user's computer (say the user's smart mobile phone), one or more computer processors of the remote server, or both. The apparatus 1000 further includes one or more additional parts described in further detail hereinbelow, such as the parts denoted 110-130 in FIG. 1A.

The additional parts may be implemented as software—say by programming the one or more computer processors to execute the method described in further detail hereinbelow and illustrated using FIG. 2A, as hardware—say as an electric circuit that implements at least a part the method, etc., or any combination thereof.

Figure 1B:
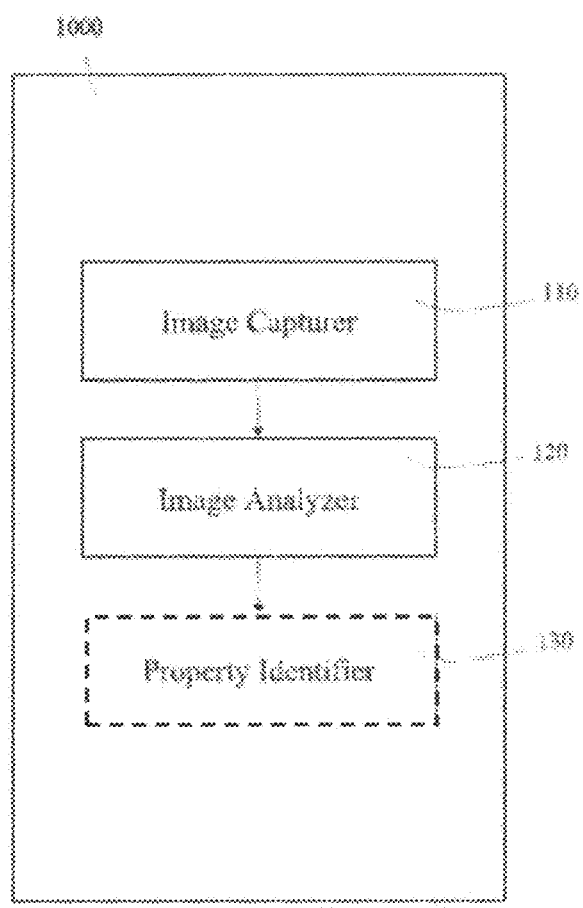
FIG. 1B is a block diagram schematically illustrating a second exemplary apparatus for testing of eyeglasses using a background object, according to an exemplary embodiment of the present invention.

In one example, one or more parts of the apparatus 1000 is implemented as a computer application such as iPhone® App, which may be downloaded to the user's smart cellular phone (say an Apple® iPhone) or table computer (say an Apple® iPad), as described in further detail hereinbelow. Reference is now made to FIG. 1B, which is a block diagram schematically illustrating a first exemplary system/apparatus 1000 for testing of eyeglasses according to an embodiment of the present invention by utilizing a background object.

In the present example system/apparatus 1000 includes an image capturer/provider module 110 configured and operable for providing/capturing one or more stills or video images of a background object, an image analyzer module 120 being in communication with the image capturer 110, and configured and operable for analyzing the image provided by the image capturer 110, as described in further detail hereinbelow. The system/apparatus 1000 also includes a property identifier 130 in communication with the image analyzer 120. The property identifier 130 identifies/determines/estimates one or more properties of the lens installed on the eyeglasses based on the analysis of the image by the image analyzer 120 (e.g. based on the analysis of the color characteristics of the image).

The background object may be physical object such as a human face, a pattern presented on a screen (say a computer screen, a screen or paper on which the pattern is projected from a slide projector, etc.), a pattern printed on a physical object (say on paper), and/or a virtual object (e.g. a pattern/image) presented on a display (screen).

Optionally, the background object is a predefined pattern—say a pattern predefined by a programmer or an operator of apparatus/system 1000.

Optionally, the image capturer 110 captures the image using an image capture device (imager/camera e.g. a mobile phone's camera) in use by the user, as described in further detail hereinbelow.

The image capturer 110 may be implemented, for example, on the user's device/computer, on a remote computer in communication with the user's device/computer or with the image capture device, or on both computers, as described in further detail hereinabove.

Optionally, the image capture device is a camera installed on a mobile device/phone in use by the user, and the image capturer 110 controls the camera, say by using the camera to capture images (say a video stream or several stills images), by forwarding one or more of the images for analysis, etc., as described in further detail hereinbelow. In other examples, the image capture device may be a camera installed on a table computer, on a laptop computer, or on another computer, similarly controlled by the image capturer 110, as described in further detail hereinbelow.

The image capturer 110 captures at least a part of the background object through a lens of a pair of eyeglasses. The image capturer 110 may capture one or more remaining parts (if any) of the background object not through the lens, as described in further detail hereinbelow, and as illustrated, for example, in FIG. 9.

Thus, in a first example, a background object in a form of a predefined pattern is presented on a screen, say an LCD (Liquid Crystal Display) Screen, as known in the art. Simultaneously to presentation of the predefined pattern on the digital screen, a user holds his eyeglasses opposite the screen, or rather places the eyeglasses on a surface (say a desktop) opposite the screen.

Then, the image capturer 110 captures the predefined pattern in an image, such that one part of the pattern is captured through one of the eyeglasses' lenses. The remaining part of the pattern extends out of the area behind the lens, and is thus captured directly—i.e. not through the lens.

As indicated above the apparatus 1000 further includes an image analyzer 120 in communication with the image capturer 110. The image analyzer 120 analyzes the image captured by the image capturer 110, as described in further detail hereinbelow, and as illustrated, for example, in FIG. 2A.

Optionally, the image analyzer 120 analyzes the image's color characteristics. For example, the image may be a digital color image based on the RGB color model, as known in the art, and the image analyzer 120 may analyze the image by comparing RGB color channel intensity values measured over the background object as captured in the image, as described in further detail hereinbelow.

In a first example, the image analyzer 120 compares between one or more same color channel intensity values (say mean or sum intensity values, each of which values is calculated over all pixels of a respective one of one or more of the R.G.B. color channels of the image) of two parts of the image in which the background object is respectively captured in the image which being viewed through the lens of the eye glasses (first part of the image) and being viewed directly—not though the lens of the eyeglasses (second part of the image).

Indeed, the background object may include multiple sections having different color contents. It should be understood that when comparing the color contents of the two parts of the image in which the background object is captured through the lens and directly, the analyzer actually analyzes to appearance of the object in the two parts of the image to identify the two parts of the image, in which appearing sections background object which have the same color content in the object. Accordingly the analyzer may segment the image to isolate/extract segments at which the similar sections of the object (with similar color content of the object) appear in the image whereby in the first part the section appears while being viewed through the lens, and in the second part, it appears while being viewed directly (not through the lens). To this end, the sections of the similar/same color content of the object, may be monochromatic sections (e.g. white color, blue color skin color or other) or may include a pattern of multiple colors whereby the similar colors are shown in the two parts of the image. Accordingly the analyzer 120 segments/extracts two parts from the image which show respective parts of the object having the similar color contents, whereby one part is viewed from through the eyeglasses lens and the other directly.

To this end, in the first example, the two parts of the object, which are captured through-the-lens and directly, respectively, are supposed to have the same color pattern/content. For example, the background object may be a predefined pattern, and the two parts of the pattern may have the same color content(s), e.g. two parts of one of the slices of the radial pattern illustrated in FIG. 5 hereinbelow. Similarly, the background object may be a face of a person—say of a user who wears the eyeglasses, and in that case too, both parts are supposed to have a same/similar color content—namely, the person's skin color.

However, in the image, in which the first part is captured through the lens, and the second/remaining part is captured directly—i.e. not through the lens, the color content of the first and second parts may be different due to spectral filtration effect of the lens (this is unless the lens is neutral).

To this end, in some embodiments the image analyzer 120 compares the different color channels in between the first and second parts of the image in which first and second parts of the object appear, so as to determine the filtration parameters of the lens. In the example in which R.G.B. image is used, one comparison may be performed between blue channel intensity values of the two parts and/or another comparison may be performed between red channel intensity values of the two parts and/or possibly another comparison another comparison may be performed between the green channel intensity values of the two parts. Accordingly other comparison may be performed in cases where the image is provided in other color pallets (e.g. such as CMKY, or L*a*b color space)

The comparison is thus used to assess a per-color-channel (i.e. per primary color) difference between the part of the background object captured through the lens and the part of the background object pattern that is rather captured not through the lens.

In a second example, the image analyzer 120 compares between absolute differences or ratios, calculated between different color channel intensity values (say mean or a sum intensity values, each of which values is calculated over all pixels of a respective one of one or more of the channels). The absolute differences or ratios are calculated for two different parts of the background object as captured in the image—say for a part captured through the lens, and for a part captured directly (i.e. not through the lens). The comparison is thus used to assess how the two parts differ in as far as the ratio or absolute difference between different primary colors in each part is concerned.

In a third example, the image analyzer 120 compares between one or more color channel intensity values (say a mean or a sum intensity value calculated over all pixels of each respective one of one or more of the channels) and a reference value predefined per each respective one of one or more of the channels. The one or more color channel intensity values may be calculated for the whole background object as captured in the image, or rather per each one of one or more different parts of the background object as captured in the image. Similarly and respectively, the one or more reference values may be defined for the whole background object or rather per each one of the one or more color sections of the background object. The comparison is thus used to assess a pre-channel (i.e. per primary color) deviation from the predefined reference values.

In a fourth example, the image analyzer 120 calculates one or more color channel intensity values (say a mean or a sum intensity value calculated over all pixels of each respective one of one or more of the channels). Again, the one or more color channel intensity values may be calculated for the whole background object as captured in the two parts of the image, or rather per each one of one or more different sections (of different color contents) of the background object as captured in the two parts of the image.

In the fourth example, the image analyzer 120 further calculates absolute differences or ratios between the color channel intensity values. Then, the image analyzer 120 compares the differences or ratios to reference values predefined for the whole background object or rather per each one of the one or more parts of the background object.

The comparison is thus used to assess the deviation of the whole background object as captured in the image, or rather of one or more specific parts of the captured background object from a predefined ratio or absolute difference between primary colors.

Optionally, in the fourth example, there are further compared the deviations from the predefined ratios or absolute differences, between a part of the background object that is captured through the lens and a part of the background object that is captured directly (i.e. not through the lens).

Optionally, the apparatus 1000 further includes a reference value calculator (not shown) in communication with the image analyzer 120. Optionally, the background object is a predefined pattern and the reference value calculator calculates the one or more reference values in a preliminary step. Optionally, in the preliminary step, the reference value calculator calculates one or more reference values per each specific one of the predefined pattern's sections based on the specific section's coloring in the predefined pattern, as described in further detail hereinbelow. The calculation may be based, for example, on an averaging or summing over intensity values expected for that section upon presentation on a screen of a specific model, in light of the screen's technical characteristics and the color selected for that section, as described in further detail hereinbelow. Optionally, the color is selected for the section based on the screen's technical characteristics—say base on technical characteristics of the screen as input by an operator or programmer of apparatus 1000, as described in further detail hereinbelow.

Additionally or alternatively, in the preliminary step, the reference value calculator allows one or more of the reference values to be defined by an operator or programmer of the apparatus 1000, say using a GUI, as described in further detail hereinbelow.

As indicated above, the property identifier 130 identifies a property of the lens installed on the eyeglasses based on the analysis of the image by the image analyzer 120, say based on the analysis of the color characteristics of the image.

Optionally, the property identifier 130 identifies the property based on the image analysis carried out using the color channel intensity values, say using one or more of the comparisons illustrated using the examples provided hereinabove, as also described in further detail hereinbelow.

Additionally or alternatively, the analyzing by the image analyzer 120 includes using the RGB intensity values color channel (e.g. the intensities of the RGB color channels of the two parts of the object) measured over the area of the background object as captured in the two parts of the image, or rather over specific sections of the background object captured in the two parts of the image, to calculate a light transmittance spectrum of the eyeglasses lens (say data indicative of a spectral graph of the lens), as described in further detail hereinbelow. Subsequently, the image analyzer 120 compares the calculated spectrum to a reference spectrum expected for the whole background object or for the specific parts. Then, the property identifier 130 may identify a property of the lens, using a result of the comparison of the spectrums, as described in further detail hereinbelow.

Thus, in one example, the background object is a predefined pattern presented on a computer screen standing behind the eyeglasses. In the example, the image analyzer 120 may calculate the reference spectrum for the whole predefined pattern or rather per each specific one of one or more of the pattern's sections. The image analyzer 120 calculates the reference spectrum based on coloring in the predefined pattern and on characteristics of a screen in use for presenting the pattern, as described in further detail hereinbelow.

Optionally, the image analyzer 120 further compares between a pair of spectrums within a predefined wavelength range—say within a wavelength range typical of visible light (say of about 400-700 NM). One of the pair spectrums is a spectrum calculated based on color channels intensity values measured over a part of image showing the part of the background object that is captured through the lens. A second one of the spectrums is a spectrum calculated based on color channel intensity values (e.g. RGB channels) measured over a part of the image showing the part of the background object that is captured directly (i.e. not through the lens).

Optionally, the image analyzer 120 may further identify a deformation along a segment within the background object—say the predefined pattern, say along a virtual linear segment which extends between two points inside a blank part of the predefined pattern as captured in the image. The two points may be selected arbitrarily or rather so as to examine one or more specific regions of interest and for identifying a difference between the regions. For example, a region of interest (ROI) may be an area in the middle of the background object as captured, an area around the center of the lens, a part partially captured through the lens and partially captured not though the lens, etc. as described in further detail hereinbelow.

The deformation may include, but is not limited to: an unexpected discontinuity of the virtual segment, a change in curvature of the virtual segment (say an unexpected sinusoidal form when expected to be straight), etc., as described in further detail hereinbelow.

Optionally, the image analyzer 120 may further identify a difference in sharpness between a part of the background object captured through the lens and a part o the background object captured directly (i.e. not through the lens). The sharpness may be calculated, for example, using Absolute Central Moments, Diagonal Laplacians, etc., as described in further detail hereinbelow.

Subsequently, based on the deformation, sharpness difference, or both, as identified by the image analyzer 120, the property identifier 130 identifies a property of the lens, as described in further detail hereinbelow.

Optionally, the image analyzer 120 uses one or more functions based on one or more of the above described comparisons identifying of the deformation and identifying of the difference in sharpness.

In one example, each one of the functions yields an indicator usable for identifying a different, respective property of the lens.

Optionally, the property identified by the property identifier 130 is a one of having a predefined coating, a predefined filter, or of having both the coating and the filter, as described in further detail hereinbelow.

Optionally, the property identified by the property identifier 130 is a one of having a High Energy Visible (HEV) light protective coating, a HEV light protective filter, or both the HEV light protective coating and the HEV light protective filter.

Optionally, the property identifier 130 identifies the property of having the HEV protective coating, filter, or both, based on a significantly lower mean of pixel intensity values in the RGB Blue channel in parts of the background object captured through the lens when compared to parts captured directly (i.e. not through the lens).

Thus, in one example, the property identifier 130 identifies the lens property of having the HEV protective coating, filter, or both, based on a comparison made between parts of the background object that are known to have a same color (say parts of a background object, the whole of which object is painted with a same color).

In the example, the property is identified when the mean of pixel intensity values in the RGB Blue channel in a part of the background object captured through the lens is at least 10% lower than in the background object's part captured directly (i.e. not through the lens).

Optionally, the image analyzer 120 calculates the means over all pixels in an area of the image occupied by the background object (say a predefined pattern presented on a screen or on paper), or rather specifically per each one of one or more parts of the area occupied by the background object, over all pixels in that part, as described in further detail hereinbelow.

Thus, in one example, the background object is a predefined pattern that is white and blank, and the image analyzer 120 calculates the mean intensity values for the whole area occupied by the predefined pattern, in the RGB Red and Blue channels. In the example, the image analyzer 120 calculates the mean for each one of the two channels, and rounds the mean to the nearest integer.

In the example, when the ratio of the rounded mean intensity value of the Blue channel to the rounded mean intensity value of the Red channel is below 0.90, the property identifier 130 identifies the property of having a HEV coating, HEV filter, or both.

Optionally, the property identified by the property identifier 130 is a one of an effective Anti-Reflection (AR) coating or filter.

Optionally, the image identifier 130 identifies that the lens has an effective Anti-Reflection (AR) coating or filter, based on a reduction of less than 3% in the mean intensity value of each one of the RGB channels when compared to predefined reference values, as described in further detail hereinbelow.

Optionally, the image identifier 130 identifies that the lens ahs an effective Anti-Reflection (AR) coating or filter, based on a less than 3% reduction in the mean intensity value of each one of the RGB channels in a part of the background object that is captured through the lens when compared to a part that is known to have a same color, but is captured directly (i.e. not through the lens).

The image analyzer 120 may calculate the mean intensity values per the whole area of the image occupied by the background object (say predefined pattern), or rather specifically per each one of one or more parts of the image area occupied by the background object, as described in further detail hereinbelow.

Optionally, the property identified by the property identifier 130 pertains to a driving compatibility of the lens.

The identifying of the property which pertains to the driving compatibility of the lens may be based on one or more requirements, as specified, for example, in the ISO (International Organization for Standardization) 8980-3 2013 standard.

A key concern when identifying a driving compatibility of a lens of a pair of eyeglasses is a driver's ability to tell one color from the other, when viewed through the lens.

For example, when light in a certain primary color is not transmitted fully through the lens, there may be distorted the color as captured through the lens. Consequently, the driver may be unable to tell one traffic light from another.

Thus, in one example made with reference being diverted to FIG. 5, the identifying of the driving compatibility property is base don the radial pattern 5000 illustrated using FIG. 5 hereinbelow.

In the example, each one of the pattern's 5000 parts/segments (also referred to hereinbelow as slices) 501-512 arranged around the central white area 500 is designed with a different color, as described in further detail hereinbelow.

Further in the example, when designing the pattern, it is made sure that for each one of the segments 501-512, a mean intensity value calculated for at least one of the RGB channels would differ in at least 40% from a mean intensity value calculated for each one of the other parts 501-512, for that channel.

Figure 5:
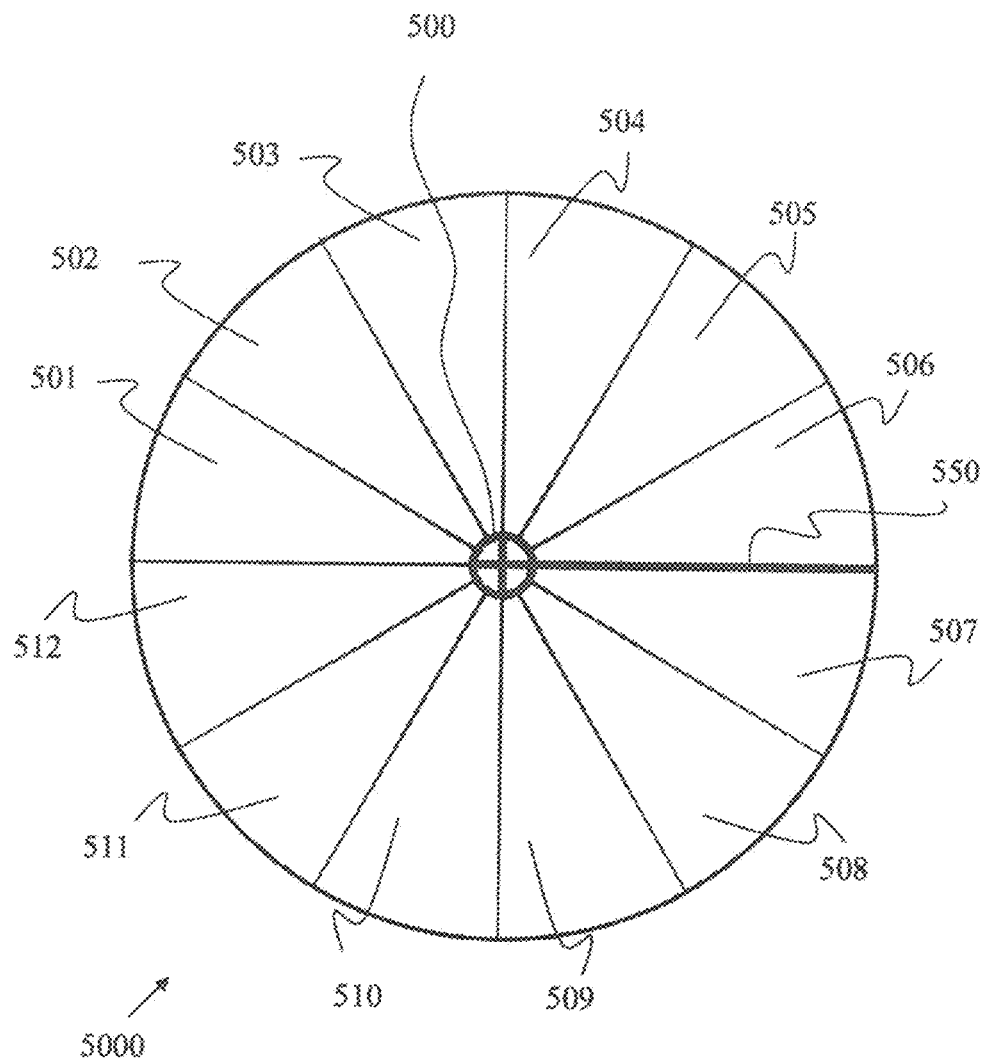
FIG. 5 is a simplified diagram schematically illustrating a first exemplary radial predefined pattern, according to an exemplary embodiment of the present invention.

Optionally, the mean intensity values are re-calculated over each part's 501-512 part that is distal with respect to the center 500 of the pattern as captured by the image capturer 110, which distal part is captured directly (i.e. not through the lens), as illustrated in FIG. 5. Then, the difference of at least 40% among the mean intensity values calculated for the different parts 501-512 for the channel is confirmed.

In the example, if for each and every one of the parts 501-512 as captured through the lens, a mean intensity value calculated for at least one of the RGB channels differs in at least 20% from a mean intensity value calculated for each one of the other parts 501-512, for the channel, there is identified that the lens fits driving. The mean intensity values are calculated over the part's part that is proximal with respect to the center 500 of the pattern, which proximal part is captured through the lens, as illustrated in FIG. 5

Optionally, the image analyzer 120 may further identify a predefined deformation along a segment within the background object—say the predefined pattern, say along a virtual linear segment which extends between two points inside a blank part of the predefined pattern, as described in further detail hereinabove.

Based on the identified deformation of the segment, the property identifier 130 may identify one or more properties of the lens (say of having a scratch, crack, or peeling), as described in further detail hereinbelow.

Optionally, the property identifier 130 further identifies one or more other properties of the lens, say using one or more parts of the method steps of analysis 220 (which may be carried out by the image analyzer 110) and identifying 230 as described in further detail hereinbelow.

Optionally, the property identifier 130 further identifies a property that has to do with opacity of the lens, say by using one or more of the properties mentioned hereinabove to roughly estimate the opacity of the lens. Thus, in one example, the property identifier 130 may estimate the opacity based on a count of the number of scratches or cracks identified on the lens, as described in further detail hereinbelow.

Optionally, the apparatus 1000 further includes a pattern projector (not shown).

Optionally, the pattern projector presents the predefined pattern on a screen (say a computer screen, a mobile phone screen, etc.).

Optionally, the pattern projector projects the predefined pattern onto a surface such as a paper sheet, etc., as known in the art. Optionally, the pattern projector projects the predefined pattern from a light source such as a slide projector, a computer screen, a screen of a mobile phone, a flashlight, an indoor or other light (say through a slide which bears the pattern), etc.

Optionally, in order to enable identifying of a property of a coating on the lens independently of the lens side (frontal side or back side) being coated, the image analyzer 120 uses both an image captured with the lens frontal side facing the light source and an image captured with the lens back side facing the light source.

The pattern projector may be implemented, for example, on a first computer (say the user's computer), on a remote computer in communication with the first computer or with the light source, or on both computers, as descried in further detail hereinabove.

Thus, in a first example, in a preliminary step, the image projector presents the predefined pattern (i.e. the background object of the example) on a screen of a laptop computer.

Optionally, in the first example, a user places a pair of eyeglasses on a surface such a desktop, such that at least a part of the presented pattern can be captured through a lens of the eyeglasses, simultaneously to presentation of the pattern on the screen.

The, the image capturer 110 captures an image of the predefined pattern.

In the first example, the image capturer 110 captures the predefined pattern (i.e. the background object of the instant example) in the image, say using a camera of a mobile phone (say the user' smart phone), on which phone, in the example, the apparatus 1000 is implemented, as described in further detail hereinbelow.

Optionally, on the background object (say on the presented predefined pattern) there appears a marking usable by a user for aligning the eyeglasses in a predefined orientation prior to capturing of the background object in the image, as described in further detail hereinbelow, and as illustrated, for example, in FIG. 5 and FIG. 6.

Optionally, the apparatus 1000 further includes a color selector.

The color selector carries out a preliminary color selection step prior to presentation of the predefined pattern, say prior to the presentation of the predefined pattern on a digital screen such as a laptop or tablet computer screen or a mobile phone screen, as described in further detail hereinbelow.

In the color selection step, the color selection for one or more parts of the predefined pattern is optimized.

The color selection may be optimized according to technical characteristics of the image capture device—say a digital camera intended to be used for capturing the image, of a device intended to be used for presenting the pattern— say a digital screen, or of both device, as described in further detail hereinbelow.

Figure 3:
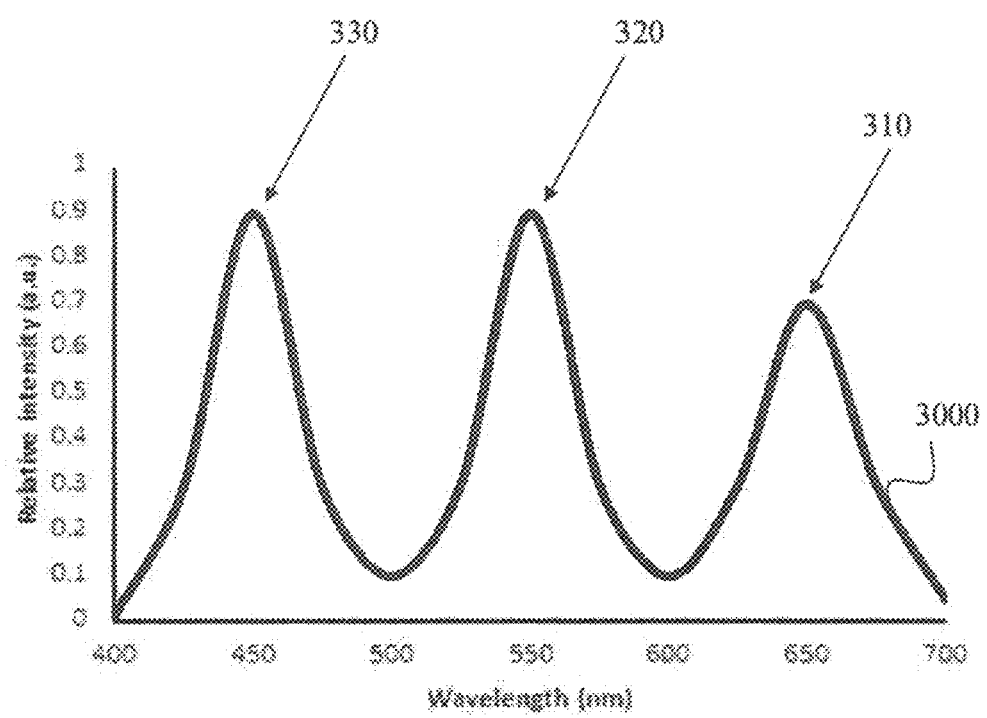
FIG. 3 is a simplified diagram schematically illustrating an exemplary graph depicting an emission spectrum of one exemplary digital screen.
Figure 4:
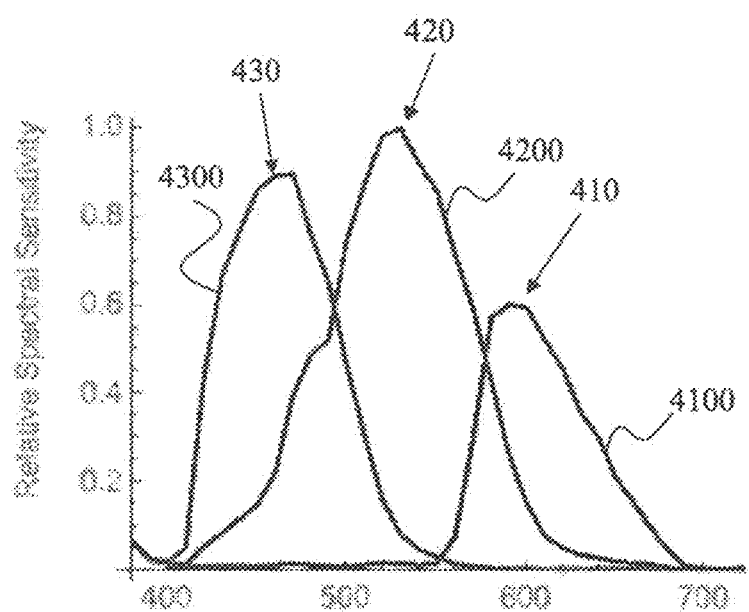
FIG. 4 is a simplified diagram schematically illustrating an exemplary set of three graphs, depicting sensitivity of one exemplary digital camera to three primary colors.

For example, the color selection may be optimized according to intensity of color emission by the screen per different colors, according to sensitivity of the camera to light in different primary colors, etc., as described in further detail hereinbelow and as illustrated for example, using FIG. 3-5.

The predefined pattern may be designed in various ways.

For example, the predefined pattern may be colored, non-colored (say grayscale), or rather have one or more colored parts and one or more non-colored (say grayscale) parts.

Optionally, the predefined pattern may be blank, non-blank (say a one with graphical or textual content), or rather have one or more blank parts and one or more non-blank parts.

Optionally, the predefined pattern includes two or more parts of different color, color level (say grey level) or texture, and each part has a respective, predefined color, color level or texture, and a respective, predefined position within the pattern.

Consequently, the image analyzer 120 may analyze the predefined pattern as captured in the image based on the color, color level or texture of at least one of the parts, and on the part's position within the predefined pattern, say using one or more of the above described comparisons, as described in further detail hereinbelow.

Optionally, the background object (say the predefined pattern) includes one or more predefined markings.

In one example, a marking 550 extends rightward from the center of a radial pattern 5000, as illustrated, for example in FIG. 5.

In other examples, the markings may include, for example, a number, an arrow, a cross, a line, words, letters, etc., as descried in further detail hereinbelow, and as illustrated, for example in FIG. 6.

Optionally, one or more of the markings may be used by the user in aligning the image capture device, the pair of eyeglasses, the screen, etc., in a predefined way, as described in further detail hereinbelow.

Optionally, the apparatus 1000 further includes an orientation determiner (not shown).

The orientation determiner automatically identifies and locates the marking on the background object (say the predefined pattern) as captured in the image.

Once identifying and locating the marking, the orientation determiner uses the markings to identify an orientation of the background object as captured in the image, to identify the background object's center, etc., as described in further detail hereinbelow.

Optionally, the identified orientation, center, or both, is used by the image analyzer 120 for analyzing the image, as described in further detail hereinbelow.

Optionally, upon identified alignment of the background object (say the pattern) in a predefined orientation, the image capturer 110 automatically forwards the image to the image analyzer 120, thereby initiating the analyzing of the image by the image analyzer 120, as described in further detail hereinbelow.

Optionally, only upon identified alignment in the predefined orientation, does the image capturer 110 forward the image to the image analyzer 120, thereby initiating the image's analysis by the image analyzer 120, as described in further detail hereinbelow.

Optionally, the orientation determiner rather identifies the orientation of the background object based on a directional aspect of the texture of the background object (say of the predefined pattern), as described in further detail hereinbelow, and as illustrated for example, in FIG. 7.

Additionally or alternatively, the orientation determiner further uses a GUI, for allowing the user to manually identify the center of the background object as captured in the image, the orientation of the captured background object, or both, say by manually marking the center or orientation, as described in further detail hereinbelow.

Thus, in one example, the GUI used by the orientation determiner is implemented using a screen of the user's mobile phone or other computer. In the example, real time video images of the background object as captured at least partially through the lens, using the image capture device of the mobile phone or table computer, are presented on the screen.

In the example, simultaneously to presentation of the video images, the user is allowed to mark the center by touching the screen, mark an orientation of the background object using a multi-touch gesture in which the user moves two fingers in a predefined way while touching the screen, etc., as known in the art of multi-touch gesture recognition.

Optionally, the apparatus 1000 further includes a user guidance manager.

The user guidance manager guides the user through one or more steps leading to the identifying of one or more properties of the lens.

Optionally, the identified orientation, center, or both, is used by the user guidance manager for guiding the user in aligning the eyeglasses and image capture device (say by moving his mobile phone) in a specific orientation with respect to each other, as described in further detail hereinbelow.

Thus, in one example, the user guidance manager guides the user to move the mobile phone over the eyeglasses, with the phone's camera facing the eyeglasses and background object, to the right, to the left, etc., until the background object as captured, aligns in a predefined orientation, as described in further detail hereinbelow.

The user may be guided for example, using vocal instructions given on the mobile phone's speaker, using a GUI implemented using titles with instructions, arrows, etc. or other cures that appear on the video images captured and presented on the phone's screen as the user moves the mobile phone over the eyeglasses, etc.

Optionally, the orientation determiner further locates one or more boundaries of the lenses of the eyeglasses, say using Canny Edge Detection, an analysis of Oriented Gabor Filter Responses, etc., or any combination thereof, as described in further detail hereinbelow.

Optionally, the user guidance manager uses the located one or more boundaries for guiding the user in aligning the image capture device (say the phone's camera) and the eyeglasses in a preferred position with respect to each other, such that the background object is captured in a predefined orientation.

For example, the user may be guide to align the image capture device and the eyeglasses, so as to have a specific part of the background objects as captured in the image, extend over two sides of the boundary, such the part is captured partially through the lens, and partially directly (i.e. not through the lens), as described in further detail hereinbelow.

Optionally, the orientation determiner further estimates location of the lens center, as described in further detail hereinbelow.

The estimating may be based, for example, on a mass center of the lens as calculated based on the location of the one or more boundaries, on intersection of a virtual vertical line positioned where the height of the lens is maximal with a virtual horizontal line positioned where the width of the lens is maximal, etc., or any combination thereof. The horizontality and verticality of the lines may be selected, for example, so as to be parallel to the horizontal side and vertical side of a smallest rectangle that would bound the located boundaries of lens, as known in the art.

Optionally, the location of the lens center may be used by the image analyzer 120, for analyzing the image, say for looking for certain curvature changes when expected on the lens center.

Optionally, the user guidance manager uses the estimated location of the lens center for guiding the user in aligning the image capture device and the eyeglasses in a predefined orientation with respect to each other, such that a specific part of the background object is captured through a preferable area of the lens, as described in further detail hereinbelow.

Optionally, the orientation determiner further locates a center of the background object, say the round blank area in the center of the pattern illustrated using FIG. 5, say using known in the at image recognition techniques, as described in further detail hereinbelow.

Optionally, the location of the background object's center may be used by the image analyzer 120, for analyzing the image, say for finding a certain feature of a known position with respect to the background object's center.

Optionally, the user guidance manager uses the located center of the background object for guiding the user in aligning the image capture device and the eyeglasses in a predefined position with respect to each other, as described in further detail hereinbelow.

Thus, in one example, the user guidance manager uses a GUI implemented using live video images captured by the user's mobile phone video camera as the user moves the mobile phone over the eyeglasses. The GUI presents the capture video images to the user in real time, as the user moves the mobile phone over the eyeglasses.

In the GUI, when the orientation determiner determines that the located background object center and the estimated lens center location in the images, are close enough, say within a predefined distance from each other (say a distance of less than 1% of the width of each one of the video images), the lens edges are colored green. However, when the orientation determiner determines that the located center of the background object and the estimated location of the lens are not close enough, the lens edges are colored red.

Further in the example, when the edges are colored green, the image capturer 110 forwards the last image captured using the phone's video camera for the image analyzer 120, thus initiating the analysis of the image by the image analyzer 120.

However, when the edges are colored red, the user guidance manager presents an arrow in the GUI, thereby guiding the user to move the phone or eyeglasses in a direction necessary for aligning the phone's video camera and the eyeglasses in a preferred orientation with respect to each other. Optionally, the preferred orientation is predefined by an operator or programmer of apparatus 1000, say using a GUI.

Optionally, the apparatus 1000 further includes a face feature identifier.

The face feature identifier identifies one or more facial features (say features of a human face) in one or more of the captured images, say using known in the art face detection methods applied on the captured images (say the video images), as described in further detail hereinbelow.

Thus, in one example, the background object is a human face captured in the image partially through the lens and partially directly (i.e. not through the lens). In the example, the face feature identifier identifies the face and a specific feature thereof (say a nose or a pupil). The face feature may be used in the analysis by the image analyzer 120 or in guiding the user (say to align the eyeglasses and image capture device in a predefined, preferred orientation with respect to each other), etc., as described in further detail hereinabove.

Optionally, the property identifier 130 further identifies an assembly quality of the eyeglasses based on the analysis by the image analyzer 120.

For example, when the eyeglasses quality of assembly is low, pressure applied on the lens by the eyeglass frame may have an effect on light transmittance in lens areas affected by the pressure. The areas affected by the pressure are thus expected to differ in their light transmittance when compared to light transmittance through parts of the lens that are not affected by that pressure.

Thus, in one example, the image analyzer 120 identifies that certain lens areas along the boundaries of the lens as identified (say by the orientation determiner) appear to have a mean RGB channel intensity value that deviates significantly (say in more than 10%) from mean RGB channel intensity values of the lens' other areas.

Since lenses are typically engaged by the eyeglass frame along parts of the lens boundaries, the property identifier 130 may thus identify an assembly quality of the eyeglasses based on that analysis by the image analyzer 120.

Thus, in one example, when the deviation of the RGB channel intensity values is lower than a reference value (say a threshold of 10%) as predefined by a user or programmer of apparatus 1000, the property identifier 130 determines that the quality of assembly is high.

However, in the example, when the deviation of the RGB channel intensity values in certain areas along the identified boundaries is higher than the reference value (say the threshold), the property identifier 130 determines that there is a problem in the quality of assembly. Optionally, the property identifier 130 further shows the parts of the frame that may have assembly problems to the user, using a GUI, say by marking the parts of the lens boundaries along which the deviation of the RGB channel intensity values is higher than the reference value, in red color.

Optionally, the apparatus 1000 is implemented on a computer (say a server computer) in remote communication with computer, say a user's mobile phone, or other computer in use for capturing one or more images of a background object, at least partially through a lens, as described in further detail hereinabove.

Thus, optionally, all parts of the apparatus 1000 are implemented on the server computer, as described in further detail hereinbelow.

Optionally, one or more of the apparatus 1000 parts may be implemented at least in part, on the mobile phone, tablet computer, or other computer in communication with the server computer, etc., as described in further detail hereinbelow.

Each one of the parts denoted 120-130 in FIG. 1B, the image receiver, and the additional parts, may be implemented as software—say by programming the one or more computer processors to execute steps of the methods described in further detail hereinbelow, as hardware—say as an electric circuit that implements at least a part of the methods, etc., or any combination thereof.

The image receiver may receive the image, for example, over the internet, an intranet network, a LAN (Local Area Network), a wireless network, another communication network or channel, or any combination thereof, as known in the art.

Figure 2A:
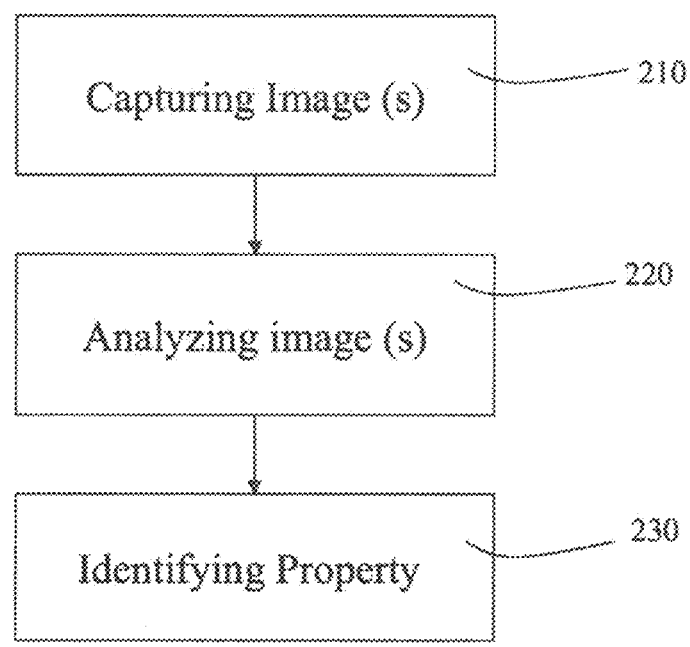
FIG. 2A is a flowchart illustrating a first exemplary computer implemented method for testing of eyeglasses using a background object, according to an exemplary embodiment of the present invention.

Reference is now made to FIG. 2A, which is a flowchart illustrating a first exemplary computer implemented method for self-administrated testing of eyeglasses, according to an exemplary embodiment of the present invention.

The exemplary method for self-administrated testing of eyeglasses may be executed, for example, on one or more computers such as a mobile phone, a tablet or other computer, say a computer in use by a user who wishes to test a pair of eyeglasses (say eyeglasses or other eyeglasses), etc. or any combination thereof.

The exemplary method may be implemented by programming the computer, say by downloading a computer application from a remote server, by uploading computer executable instructions from a computer readable medium, etc., as known in the art.

Thus, the method may include steps that are executed by a computer application such an iPhone® or an Android™ App, which may be downloaded to a mobile phone (say an Apple® iPhone or a Samsung® Galaxy smart phone) or table computer (say an Apple® iPad). The computer application may use the mobile phone's camera and screen, for carrying out some of the steps of the exemplary method, as described in further detail hereinbelow.

In a first example, all method steps such as the steeps of capturing 210, analyzing 220 and identifying 230, as described in further detail hereinbelow, are carried out on the computer, say on the user's mobile phone, tablet computer or laptop computer, by the computer application.

In a second example, the computer application rather communicates with a remote computer (say a remote server computer), for carrying out one or more parts of the method steps. Thus, in the second example, at least a part of the below described steps of analyzing 220 and identifying 230, is carried out on the remote computer (say the server computer).

Optionally, in the second example, the step of capturing 210 is also carried out on the remote server computer, say by remotely controlling an image capture device (say a mobile phone camera) in use (say by the user), for capturing 210 a background image 210 in one or more images, as described in further detail hereinbelow.

Thus, in the exemplary method, there is captured 210 one or more stills or video images of a background object such as a human face, a pattern presented on a screen (say a computer screen, a screen or paper on which the pattern is projected from a slide projector, etc.), a pattern printed on a physical object (say on paper), etc. The pattern may be defined in advance—say by a programmer or an operator of apparatus 1000.

Optionally, the background object is captured 210 in the image using an image capture device (say the user's mobile phone camera), say by the image capturer 110 of apparatus 1000, as described in further detail hereinabove.

Optionally, the image capture device is a video camera installed on a mobile phone in use by the user, and the image capturer 110 controls the camera, say by using the camera to capture 210 images, by forwarding one of the images for analysis 220, etc., as described in further detail hereinabove.

In other examples, the image capture device may be a camera installed on a tablet computer, on a laptop computer, or on another computer, as described in further detail hereinabove.

At least a part of the background object is captured 210 through a lens—say a lens of a pair of eyeglasses that belongs to a user of the computer (say mobile phone).

Optionally, one or more remaining parts (if any) of the background object are also captured 210 in the image, but rather directly—i.e. not through the lens, as described in further detail hereinbelow, and as illustrated, for example, in FIG. 9.

In a first example, a background object in a form of a predefined pattern is presented on a digital screen (say an LCD screen, as known in the art).

In the first example, simultaneously to presentation of the predefined pattern on the digital screen, a user hold his eyeglasses opposite the screen, or rather places the eyeglasses on a surface (say a desktop) opposite the screen.

Then, there is captured 210 the predefined pattern in an image, such that one part of the pattern is captured through one of the eyeglasses' lenses. The remaining part of the pattern extends out of the area behind the lens, and is thus captured directly—i.e. not thorough the lens.

Then, one or more of the captured 210 images are analyzed 220, say by the image analyzer 120 of apparatus 1000, as described in further detail hereinabove.

Optionally, the analyzing 220 includes analyzing 220 the image's color characteristics of the image.

For example, the image may be a digital color image based on the RGB color model, and the analyzing 220 may include a comparison based on RGB color channel intensity values measured over the background object (say the predefined pattern) as captured 210 in the image, as described in further detail hereinbelow.

The digital color image may be made of many pixels, and each one of the pixels may be made of a combination of three primary colors (Red, Green and Blue).

A channel in this context is the equivalent of a grayscale image (or a part of such an image) of the same size as the digital color image (or the part), made of one of the primary colors (rather than grey). Thus the channel may also be perceived as a monochromatic image in red, green and blue.

Each one of the monochromatic images (i.e. channels) is made of a same number of pixels as the color image or part, which in the case of the monochromatic image, are pixels in a same primary color, which are sometimes referred to as sub-pixels. Similarly to a grayscale image pixel, each of the monochromatic image's pixels is characterized by an intensity specific to that pixel.

Thus, each RGB color image (or a part of such an image) may be characterized by a combination of three channels (Red, Green, and Blue).

In a first example, the analysis 220 includes a comparison made between one or more same color channel intensity values (say one or more mean or sum intensity values, each of which values is calculated over all pixels of a respective one of one or more of the channels) of two parts of the background object as captured 210 in the image.

In the first example, the two parts are supposed to have a same color. For example, the background object may be a predefined pattern and the two parts may have a same color in the pattern as predefined (say by a user of apparatus 1000), say two parts of one of the slices of the radial pattern illustrated in FIG. 5 hereinbelow.

However, in the image, one of the parts is captured 210 through the lens, whereas a remaining part is captured 210 directly—i.e. not through the lens, as described in further detail hereinbelow. Consequently, the color of the part captured 210 through the lens may differ from the color of the part captured 210 directly.

In the example, one comparison is made between blue channel intensity values of the two parts and another comparison is made between red channel intensity values of the two parts.

The comparison is thus to assess a per-channel (i.e. per primary color) difference between the part of the background object captured 210 through the lens and the part of the background object pattern that is rather capture 210 directly (i.e. not through the lens).

In a second example, the analysis 220 includes a comparison made between absolute differences or rations, calculated between different color channel intensity values (say a mean or sum intensity value calculated over all pixels of each respective one of one or more of the channels). The absolute differences or ratios are calculated for two different parts of the background object as captured 210 in the image—say for a part captured 210 through the lens, and for a part captured 120 directly (i.e. not through the lens).

The comparison is thus used to assess how the two parts differ in as far as the ratio or absolute difference between different primary colors is concerned.

In a third example, the analysis 220 includes a comparison made between one or more color channel intensity values (say mean or sum intensity values, each one of which values is calculated over all pixels of a respective one of one or more of the channels) and a reference value predefined per the respective channel.

The one or more color channel intensity values may be calculated for the whole background object as captured 210 in the image, or rather per each one of one or more different parts of the background object as captured 210 in the image. Similarly and respectively, the one or more reference values may be defined for the whole background object or rather per each one of the one or more parts of the background object.

The comparison is thus used to assess a per-channel (i.e. per primary color) deviation from the predefined reference values.

In a fourth example, the analysis 220 includes calculating one or more color channel intensity values (say mean or sum intensity values, each one of which values is calculated over all pixels of a respective one of one or more of the channels). Again, the one or more color channel intensity values may be calculated for the whole background object as captured

210 in the image, or rather per each one of one or more different parts of the background object as captured 210 in the image.

In the fourth example, the analysis 220 further includes calculating absolute differences or ratios between the color channel intensity values. Then, the differences or ratios are compared to reference values predefined for the whole background object or rather per each one of the one or more parts of the background object.

The comparison is thus used to assess the deviation of the whole background object as captured 210 in the image, or rather of one or more specific parts of the captured 210 background object from a predefined ratio or absolute difference between primary colors.

Optionally, in the fourth example, there are further compared the deviations from the predefined ratios or absolute differences, between a part of the background object that is captured 210 through the lens and a part of the background object that is captured 210 directly (i.e. not through the lens).

Optionally, the background object is a predefined pattern and the method further includes a preliminary step in which there is calculated the one or more reference values, say by the reference value calculator of apparatus 1000, as described in further detail hereinabove.

Optionally, in the preliminary step, the one or more reference values are calculated per each specific one of the predefined pattern's parts based on the specific part's coloring in the predefined pattern, as described in further detail hereinbelow.

The calculation may be based, for example, on an averaging or summing over intensity values expected for that part upon presentation on a screen of a specific model, in light of the screen's technical characteristics and the color selected for that part.

Optionally, the color is selected for the part based on the screen's technical characteristics which may be input say by an operator or programmer of apparatus 1000, as described in further detail hereinabove.

Additionally or alternatively, the preliminary step includes allowing one or more of the reference values to be defined by an operator or programmer of the apparatus 1000, as described in further detail hereinabove.

Based on the image analyzed 220, say based on the analysis 220 of the color characteristics of the image, there may be identified 230 a property of the lens, say by the property identifier 130, as described in further detail hereinbelow.

Optionally, the property is identified 230 based on the color channel intensity values, say using one or more of the comparisons illustrated using the examples provided hereinabove, as described in further detail hereinabove.

Additionally or alternatively, the analyzes 220 may include using the RGB color channel intensity values measured over the whole area of the background object as captured 210 in the image, or rather over specific parts of the captured 210 background object, to calculate a transmittance spectrum (say a spectral graph, as known in the art).

For example, the RGB color channel intensity values may be used to calculate a VIS (Visual Light) Spectrum in the 400-700 NM wave length range, using color estimation methods, as described in further detail hereinbelow.

Consequently, the calculated spectrum may be compared to a predefined reference spectrum or to a spectrum calculated over a part of the background object, which part is supposed to bear the same color.

Thus, in one example, the background object is a predefined pattern presented on a computer screen standing behind the eyeglasses. In the example, there is calculated a reference spectrum for the whole predefined pattern or rather per each specific one of one or more parts of the pattern.

For example, the reference spectrum may be calculated based on coloring in the predefined pattern and on characteristics of a screen in use for presenting the pattern, say using one of the methods described in further detail hereinbelow.

Optionally, the analyzing 120 includes a comparison made between a pair of spectrums. One of the spectrums is a spectrum calculated based on RGB color channel intensity values measured over a part of the background object that is captured 210 through the lens. A second one of the spectrums is a spectrum calculated based on RGB color channel intensity values measured over a part that is captured 210 directly (i.e. not through the lens). Consequently, one or more properties of the lens may be identified 230, base on the comparison made between the two spectrums.

In the example, in a preliminary step which follows the design of a predefined pattern intended for use as the background object, a light spectrometer is used to measure light intensities over a visual light wavelength range of say 400-700 NM, for the pattern when presented on a digital screen. In the example, the pattern is similar to the pattern 5000 illustrated in FIG. 5, and each slice 501-512 bears a different color.

Based on the light intensities measured using the light spectrometer, there is calculated a specific reference spectrum (say a curve depicting light intensity as a function of wavelength) for each one of the twelve slices 501-512, each of which slices is colored uniformly, though with a color different from the others' 501-512.

In the example, as a part of the analysis 220 step, a triad of RGB channel intensity values of each slice's 501-512 part captured 210 (say by a digital camera) in the image directly (i.e. not through the lens) and the reference spectrum calculated for that slice in the preliminary step, are construed as matching.

Based on the twelve pair of matched triads and reference spectrums, there is calculated a spectrum fitting function which matches a spectrum for any possible triad of RGB channel intensity values. The spectrum fitting function may be calculated using Polynomial Curve Fitting based on Least Square Fitting, Wiener Estimation, etc., as known in the art.

Then, using the spectrum fitting function, there is matched a second spectrum for each slice 501-512, based on a triad of RGB channel intensity values of the slice's 501-512 part captured 210 in the image, through the lens.

Consequently, for each slice 501-512 there is compared the second spectrum matched to the slice 501-512 and the reference spectrum calculated for the slice 501-512 in the preliminary stage, for identifying 230 a property of the lens, say using the property identifier 130, as described in further detail hereinabove.

Optionally, the analysis 220 further includes identifying a predefined deformation along a segment within the background object—say the predefined pattern.

In one example, the segment is a virtual linear segment which extends between two points inside a blank part of the predefined pattern as captured 210 in the image.

The two points may be selected arbitrarily or rather so as to examine one or more specific regions of interest—say an area in the middle of the background object as captured 210, an area around the center of the lens, a part partially captured 210 through the lens and partially captured 210 not through the lens, etc. as described in further detail hereinbelow.

The deformation may include, but is not limit to: an unexpected discontinuity of the segment, a change in curvature of the segment (say an unexpected sinusoidal form or a high frequency of amplitude changes, when expected to be straight), etc., as described in further detail hereinbelow.

Optionally, as a part of the analysis 220, there is further identified a difference in sharpness between a part of the background object captured 210 through the lens and a part of the background object captured 210 directly (i.e. not through the lens).

The sharpness of may be calculated, for example, using Absolute Central Moments, Diagonal Laplacians, etc., as known in the art.

Subsequently, based on the identified deformation, sharpness difference, or both, there is identified 230 a property of the lens, as described in further detail hereinbelow.

Optionally, the analyzing 220 includes using one or more functions based on ne or more of the above described comparisons, identifying of the deformations, and identifying of the sharpness difference.

In one example, each one of the functions yields an indicator usable for identifying a different, respective property of the lens through which at least a part of the background object is captured 210 in the image.

Optionally, the identified 230 property is one of having a predefined coating, a predefined filter, or of having both the coating and the filter, say by the property identifier 130, as described in further detail hereinabove.

Optionally, the identified 230 property is one of having a High Energy Visible (HEV) light protective coating, a HEV light protective filter, or both the HEV light protective coating and the HEV light protective filter.

Optionally, the property of having the HEV protective coating, filter, or both, is identified 230 based on a significantly lower mean of pixel intensity values in the RGB Blue channel in parts of the background object captured through the lens when compared to parts captured directly (i.e. not through the lens).

Thus, in one example, the lens property of having the HEV protective coating, filter, or both, is identified 230 based on a comparison made between parts of the background object that are known to have the same color (say parts of a background object, the whole of which object is painted with a same color).

In the example, the property is identified 230 when the mean of pixel intensity values in the RGB Blue channel in the background object's parts captured 210 through the lens is at least 10% lower than in the background object's parts captured 210 directly (i.e. not through the lens).

Optionally, the analysis 220 includes calculating the means over all pixels in an area of the image occupied by the background object (say a predefined pattern presented on a screen or on paper), or rather specifically per each one of one or more parts of the area occupied by the background object, over all pixels in that part, as described in further detail hereinbelow.

In one example, the background object is a predefined pattern that is white and black, and the mean intensity values are calculated for the whole area occupied by the predefined pattern, in the RGB Red and Blue channels. In the example, the mean intensity value for each one of the two channels is calculated and rounded to the nearest integer.

In the example, when the ratio of the rounded mean intensity value of Blue channel to the rounded mean intensity value of the Red channel is below 0.90, there is identified 230 the property of having a HEV coating, HEV filter, or both.

In one example, the image capture device is an eight bit digital camera, as known in the art.

In the example, when the mean intensity value calculated for the RGB Blue channel is lower than 200 and the mean intensity value calculated for the RGB Red channel is higher than 240, there is identified 230 the property of having a HEV coating, a HEV filter, or both.

Optionally, the identified 230 property is one of an effective Anti-Reflection (AR) coating or filter.

Optionally, there is identified 230 that the lens has an effective AntiReflection (AR) coating or filter, based on a reduction of less than 3% in the mean intensity value of each one of the RGB channels when compared to predefined reference values, as described in further detail hereinbelow.

Optionally, there is identified 230 that the lens has the effective AR coating or filter, based on a less than 3% reduction in the mean intensity value of each one of the RGB channels in a part of the background object that is captured 210 in the image, through the lens, when compared to a part that is known to have a same color, but is captured 210 directly (i.e. not through the lens).

The mean intensity values may be calculated per the whole area of the image occupied by the background object (say predefined pattern), or rather specifically per each one of one or more parts of the image area occupied by the background object, as described in further detail hereinbelow.

Thus, in one example, when the image capture device is an eight bit digital camera and the distance between the image capture device and the lens is small enough (say less than 40 centimeters), the device's maximal intensity value of 255 (in the 0-255 range possible with eight bits) is likely to be the maximal intensity actually measured.

Consequently, in the example, when all or a predefined one or more of the RGB channel mean intensity values is at least 248 (i.e. higher than 97% of 255), there is identified 230 the property of having an effective AR coating or filter.

However, with a longer distance, the maximal intensity actually measured may be lower. In one example, the maximal intensity actually measured is 200, and consequently, in the example, when all or a predefined one or more of the RGB channel mean intensity values is higher than say 194 (i.e. 97% of 200), there is identified 230 the property of having an effective AR coating or filter.

Optionally, the identified 230 property is one of a degree of darkness of the lens.

In one example, there is identified 230 that the lens are too dark based on a ratio calculated in the analysis 220 step between two overall mean intensity values.

The first overall mean intensity value is calculated over all RGB channels, for all parts of the background object that are captured 210 through the lens, and the second overall mean intensity value is calculated over all RGB channels, for all parts of the background object that are captured 210 directly (i.e. not through the lens).

Optionally, the property identifier 230 (say by the property identifier 130) is a one of a roughly estimated color of the lens.

In one example, the identifying 230 involves a rough estimation of the color of the lens, based on a comparison made between two triads of RGB mean intensity values.

The first triad consists of RGB mean intensity values calculated per RGB channel, over a part of a white area of the background object as captured 210 through the lens. The second triad consists of RGB mean intensity values calculated per RGB channel, over a part of the white area of the background object as captured 210 directly (i.e. not through the lens).

Thus, in one example, the mean intensity value calculated for the green channel over the part captured 210 through the lens, as a part the analysis 220, is at least 95% of the mean intensity value calculated for the green channel over the part captured 210 directly. However in the example, the calculated red and blue mean intensity values differ more significantly between the two parts. Consequently, there is identified 230 the property of the lens being roughly, green.

Additionally or alternatively, the background area is rather non-white (say an area that is uniformly colored green, blue, purple, etc.).

Optionally, based on the identified 230 property of the roughly estimated color, there may be further identified 230 a property of discoloration or yellowness of the lens, say when there is known in advance (say through input from an operator of apparatus 1000) that the lens is supposed to be colorless.

Optionally, the identified 230 pertains to a driving compatibility of the lens.

The identifying 230 of the property which pertains to the driving compatibility of the lens may be based on one or more requirements, as specified, for example, in the ISO (International Organization for Standardization) 8980-3 2013 standard.

A key concern when identifying a driving compatibility of a lens of a pair of eyeglasses is a driver's ability to tell one color from the other, when viewed through the lens. For example, when light in a certain primary color is not transmitted fully through the lens, there may be distorted the color as captured 210 through the lens. Consequently, the driver may be unable to tell one traffic light from another.

Thus, in one example made with reference being diverted to FIG. 5, the identifying 230 of the driving compatibility property (say by the property identifier 130) is based on the radial pattern 5000 illustrated using FIG. 5 hereinbelow.

In the example, each one of the pattern's 5000 parts (also referred to hereinbelow as slices) 501-512 arranged around the pattern's 5000 central white area 500 is designed with a different color, as described in further detail hereinbelow.

Further in the example, when designing the pattern 5000, it is made sure that for each one of the parts 501-512, a mean intensity value calculated for at least one of the RGB channels would differ in at least 40% from a mean intensity value calculated for each one of the other parts 501-512, for that channel.

In the example, as captured 210 in the image, the predefined pattern's 5000 white central area 500 aligns under the center of the lens, such that a part of each slice 501-512, which part is proximal with respect to the central area 500, is captured 210 through the lens. However, the remaining part, which part is distal with respect to the center of the lens, is captured 210 directly (i.e. not through the lens).

That is to say that in the example, the lens is smaller than the pattern as being presented, and consequently, when the white central area 500 aligns under the center of the lens, each one of the slices 501-512 arranged around the white central area 500 is captured 210 partially through the lens and partially directly, from around the lens.

Optionally, the mean intensity values are re-calculated over each part's 501-512 part that is distal with respect to the center 500 of the pattern as captured 210 in the image, which distal part is captured 210 directly (i.e. not through the lens). Then, the difference of at least 40% among the mean intensity values calculated for the different parts 501-512, for that channel is confirmed.

In the example, as a part of the analysis 220 of the image, for each and every one of the parts 501-512 as captured 210 through the lens, a mean intensity value is calculated per each one or more of the RGB channels, as described in further detail hereinabove.

Then, if for at least one of channels, the mean intensity value calculated for that part, differs in at least 20% from a mean intensity value calculated for each one of the other parts 501-512, for that channel, there is identified 230 that the lens fits driving. The means intensity values are calculated over the part's part that is proximal with respect to the center 500 of the pattern, which proximal part is captured through the lens, as illustrated in FIG. 5.

Optionally, the analysis 220 further includes identifying a predefined deformation along a virtual segment within the background object—say the predefined pattern, say along a linear segment which extends between two points inside a blank part of the predefined pattern, as described in further detail hereinabove.

The two points may be selected arbitrarily or rather so as to examine one or more specific regions of interest and for identifying a difference between the regions. For example, a region of interest (ROI) may be an area in the middle of the background object as captured, an area around the center of the lens, a part partially captured through the lens and partially captured not though the lens, etc. as described in further detail hereinabove.

Optionally, the analysis 220 further includes identifying a predefined deformation along a real segment within the background object—say a line forming a part of the predefined pattern, as described in further detail hereinabove.

The predefined deformation may be identified, for example, using canny edge detection. Hough transform methods, a measurement of the lengths of continuous lines or circles, etc., or any combination thereof, as known in the art.

Optionally, as a part of the analysis 220, there is further identified a difference in sharpness between a part of the background object captured 210 through the lens and a part of the background object captured 210 directly (i.e. not through the lens), as described in further detail hereinabove.

Based on the identified deformation, sharpness difference, or both, there may be identified 230 one or more properties of the lens (say of having a scratch, crack, or peeling), as described in further detail hereinbelow.

Thus, in a first example, an identified deformation includes an unexpected discontinuity of the segment, and there is further identified a blur (i.e. reduction of sharpness) in the segment's part captured 210 through the lens when compared to the segment's part captured 210 directly (i.e. not through the lens).

More specifically, in the example, the discontinuity of the segment is found only in a part of segment that is captured 210 through the lens, whereas the part of the segment captured 210 directly seems continuous.

In the example, the deformation is measured through FFT (Fast Fourier Transform) based analysis 220 of grayscale or specific RGB channel's intensity values along the segment, and the analysis 220 shows high amplitude at high frequency along a part of the segment that is captured 210 through the lens. The FFT analysis thus shows high changes over a relatively small area (relative to the segment's width) in the part captured 210 through the lens.

In the example, a high amplitude is defined as a one that is say, ten times higher than the amplitude resultant upon that FFT analysis 220 when carried out on a part of the segment that is captured 210 directly (i.e. not through the lens).

In the first example, based on the high amplitude at high frequency and the blur, there may be identified 230 a property—say a presence of one or more scratches on the lens.

In a second example, an identified deformation may include a paling effect along a part of the segment (say the thin black line) captured through 210 the lens, though the segment may still maintain its continuity along that part. Further, in the second example, there is also identified a blur (i.e. a reduction of sharpness) in the segment's part captured 210 through the lens when compared to the segment's part captured 210 directly (i.e. not through the lens), as described in further detail hereinabove.

More specifically, in the second example, the paling effect is found only in the part of segment that is captured 210 through the lens.

In the example, the deformation is measured through FFT (Fast Fourier Transform) based analysis 220 of grayscale or specific RGB channel's intensity values along the segment, and the analysis 220 shows high amplitude at low frequency along a part of the segment that is captured 210 through the lens. The FFT analysis thus shows low changes over a relatively wide area (relative to the segment's width) in the part captured 210 through the lens.

In the example, a high amplitude is defined as a one that is say, ten times higher than the amplitude resultant upon that FFT analysis 220 as carried out on a part of the segment that is captured 210 directly (i.e. not through the lens).

In the second example, based on the high amplitude at low frequency and the blur, there may be identified 230 a property—say a presence of peeling on the lens.

In a third example, an identified deformation includes an unexpected discontinuity of a segment. the discontinuity of the third example is a one characterized by several white cuts along the segment.

In the third example, based on the identified deformation, there may be identified 230 a property—say a presence of cracks on the lens.

In a fourth example, an identified deformation includes an unexpected sinusoidal or other waveform appearance of a segment supposed be straight. Then, based on the waveform appearance, there is identified 230 a property of an inconsistency of the lens.

Optionally, there is further identified 230 a property that has to do with opacity of the lens or a general quality of the lens, say by using one or more of the properties mentioned hereinabove to roughly estimate the opacity of the lens.

Thus, in one example, the property identifier 130 may estimate the opacity based on a count of the number of scratches or cracks identified, on an assessment of the percentage of lens area that is covered by scratches, etc.

In the example, for estimating the opacity, the property identifier 130 may use a reference table predefined by an operator or programmer, which table gives a level of opacity per a number of scratches and cracks, per an estimated percentage of the lens area that is covered by scratches, etc.

Optionally, when captured 210, the predefined pattern is presented on a screen (say a computer screen, a mobile phone screen, etc.), say by the pattern projector, as described in further detail hereinabove.

Optionally, when captured 210, the predefined pattern is rather projected onto a surface such as a paper sheet, etc., as known in the art. For example, the predefined pattern may be projected from a light source such as a slide projector, a computer screen, a screen of a mobile phone, a flashlight, an indoor or other light (say through slide which bears the pattern), etc.

Optionally, the projection of the predefined pattern is carried out by a first computer (say the user's computer), by a remote computer in communication with the first computer or with the light sources, or both, as described in further detail hereinabove.

In one example, in a preliminary step, for predefined pattern (i.e. the background object of the example) is presented on a screen of a laptop computer.

Optionally, in the example, a user places a pair of eyeglasses on a surface such as a desktop, such that at least a part of the presented pattern can be captured through 10 a lens of the eyeglasses, simultaneously to presentation of the pattern on the screen.

Then, the predefined pattern (i.e. the background object of the instant example) is captured 210 in an image, say using a camera of the user's mobile phone (say smart phone), as described in further detail hereinbelow.

The capturing 210 of the background object in the image may be triggered by a manual operation—say a user's clicking on a button presented in a GUI, on the phone's screen, or rather automatically—say upon alignment of the background object in a predefined way, as described in further detail hereinbelow.

Figure 6:
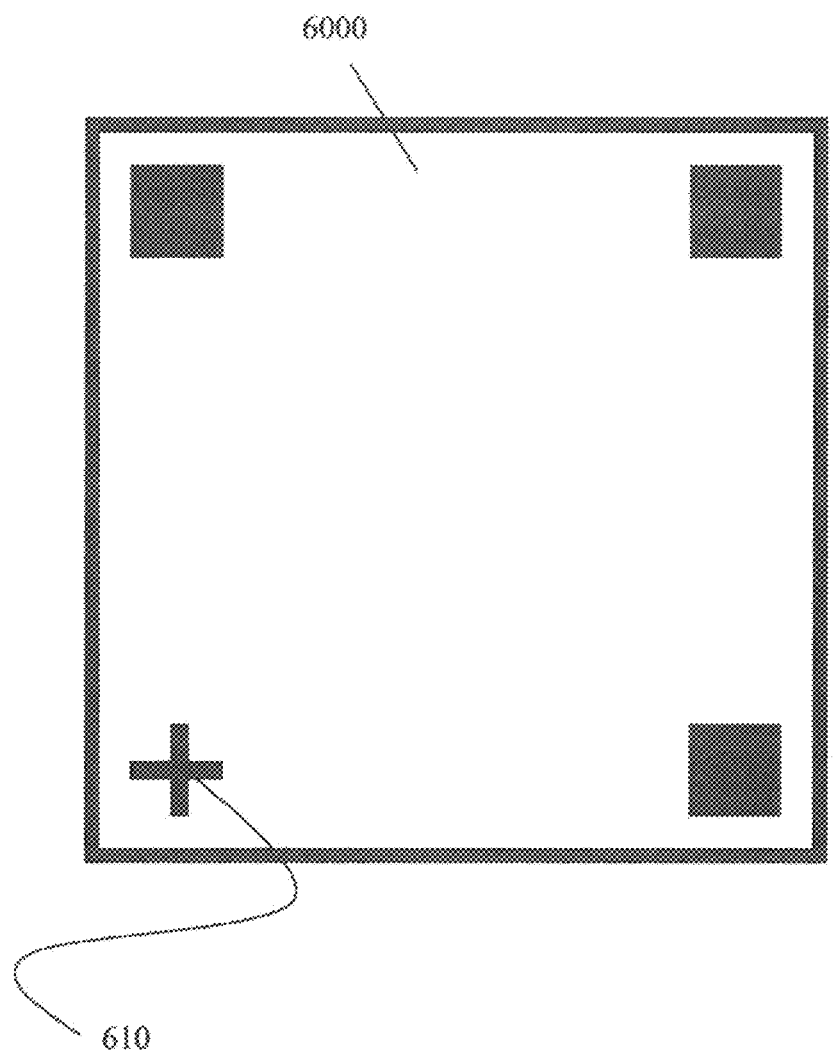
FIG. 6 is a simplified diagram schematically illustrating a first exemplary planar predefined pattern, according to an exemplary embodiment of the present invention.

Optionally, on the background object (say the predefined pattern), there appears a marking usable by the user for aligning the pair of eyeglasses and the image capture device in a predefined orientation with respect to each other, prior to the capturing 210, as illustrated, for example, in FIG. 5 and FIG. 6.

Figure 7:
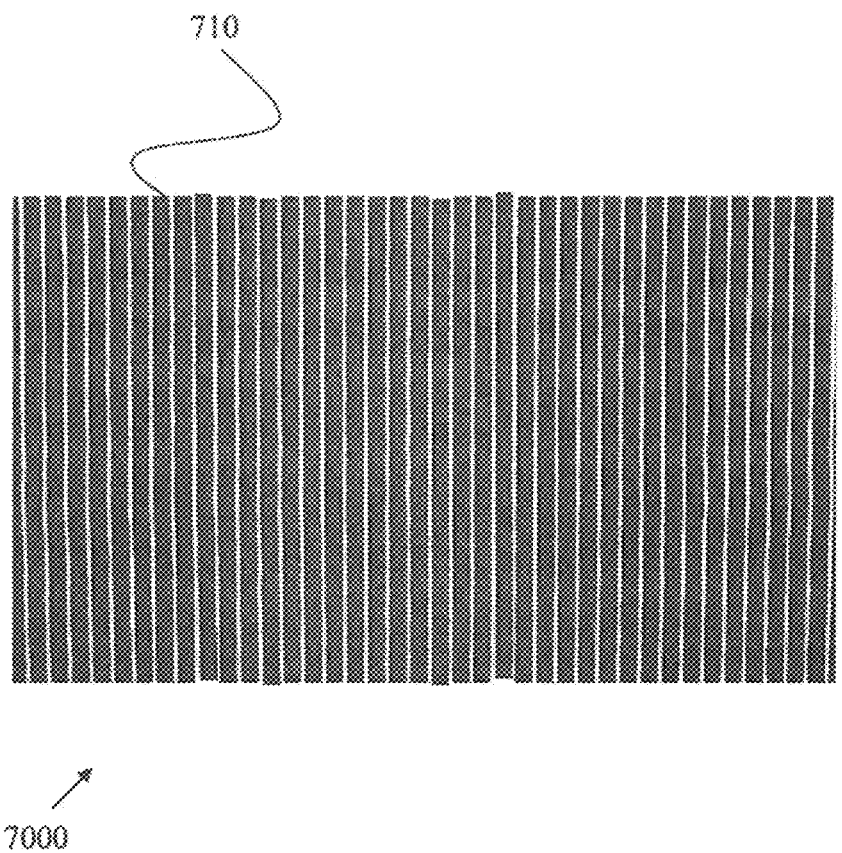
FIG. 7 is a simplified diagram schematically illustrating a second exemplary planar predefined pattern, according to an exemplary embodiment of the present invention.

Optionally, the background object (say the predefined pattern has a texture that has a directional aspect usable by the user for aligning the pair of eyeglasses and the image capture device in a predefined orientation with respect to each other, prior to the capturing 210, as illustrated, for example, in FIG. 7.

Optionally, the method further includes a preliminary step in which color selection for one or more parts of the background object (say a predefined pattern) is optimized according to technical characteristics of the image capture device (say a digital camera), of a device used for preventing the pattern (say a digital screen), or of both.

The light emission difference among different digital screens, is now explained with reference being made to FIG. 3, which is a simplified diagram schematically illustrating an exemplary graph depicting an emission spectrum of one exemplary digital screen.

Digital screens such as Liquid Crystal Display (LCD) or LED (Light-Emitting Diode) computer and smart phone screens may differ in their emission spectra. Those screens are often characterized as tri-chromatic light sources that emit light using three basic types of tiny light sources also referred to as sub-pixels—Red, Green, and Blue.

For each digital screen, a graph depicting intensity of the light emitted from the digital screen, usually peaks at a first wavelength that is in the range of red light (~570-700 nm), as a second wavelength that is in the range of green light (~500-580 nm), and at a third wavelength that is in the range of blue light (~430-490 nm).

However, for each different screen model, the graph usually peaks at a different first (i.e. red light) wavelength, a different second (i.e. green light) wavelength and a different third (i.e. blue light) wavelength.

Thus, for one exemplary digital screen, the graph 3000 has a first peak 310 at a wavelength within the ~570-700 nm range of red light, a second peak 320 at a wavelength within the ~500-580 nm range of green light, and a third peak 330 at a wavelength within the ~430-490 nm range of blue light.

The light sensitivity difference among different digital cameras is now explained with reference being made to FIG. 4, which is a simplified diagram schematically illustrating an exemplary set of three graphs, depicting sensitivity of one exemplary digital camera to three primary colors.

A stills camera or a video camera usually includes many small sensors such as CMOS (Complementary Metal Oxide Semiconductor) sensors or CCD (Charge Coupled Device) sensors.

Those small sensors are used for capturing the image, and have different sensitivity for each one of the Red, Green, and Blue primary colors, respectively.

However, the sensitivity of the sensors to each one of the primary colors also varies among different models of digital cameras.

Consequently, for a different camera model (or other image capture device model), the peak of sensitivity for each one of the three types is usually different.

Thus, for one camera model, a graph 4100 depicting the sensitivity of red light sensors picks 410 at a first wavelength, a graph 4200 depicting the sensitivity of green light sensors picks 420 at a second wavelength, and a graph 4300 depicting the sensitivity of blue light sensors peaks 430 at a third wavelength.

However, for a different camera model, each one of the three graphs 4100-4300 may be different and pick at a different wavelength.

An exemplary optimization of color selection for different parts of a background object (say a predefined pattern), according to technical characteristics of an image capture device—say a digital camera, of a device used for presenting the pattern—say a digital screen, or both, is now explained with reference being made to FIG. 5.

FIG. 5 is a simplified diagram schematically illustrating an exemplary radial predefined pattern, according to an exemplary embodiment of the present invention.

One exemplary background object is a radial pattern 5000 which may be presented on a computer screen, printed on paper, projected onto a screen surface, etc., as known in the art.

The radial pattern 5000 is a round pattern predefined, say by a programmer or operator of apparatus 1000.

As illustrated using FIG. 5, the predefined radial pattern 5000 has two or more parts 501-512 in a form of slices 501-512 arranged around a center of the pattern 5000, and more specifically, around a round central area 500 of the pattern 5000.

Optionally, the pattern 5000 is a colored pattern. Alternatively, the pattern is rather non-colored, or rather a pattern that includes one or more colored parts and one or more parts that are not colored (say one or more grayscale or white parts).

Optionally, the pattern 5000 is radially symmetric—i.e. symmetric with respect to the center of the pattern 5000, such that parts 501-512 positioned opposite each one, on opposite sides of the pattern's 5000 center have the same color and texture. Consequently, the radially symmetric pattern may be captured 210 in an image, through both lenses of a pair of eyeglasses, such that a pattern part captured 210 through one lens is symmetric to a pattern part captured 210 through another lens, and a comparison between the two parts reveals a difference between the lenses.

Optionally, the radially symmetric pattern may be captured 210 in an image, such that one of the pattern's parts 501-512, which part is colored uniformly, is captured 210 in the image. One part of the uniformly colored part is captured 210 through one of the lenses, and the remaining part of the uniformly colored part is captured 210 directly (i.e. not through a lens). Consequently, a comparison made between the two parts of the uniformly colored part is captured 210 in the image, may help identify 230 a property of the lens, as described in further detail hereinbelow.

In one example, the predefined pattern 5000 is a colored pattern designed with a color selection that corresponds to the wavelength at which light emitted from a digital screen used to present the pattern peaks, as described in further detail hereinabove.

Thus, in the example, some of the parts 501-512 of the exemplary radial pattern 5000 may be designed with colors that match the maximal hue values for the basic colors (Blue, Green and Red) possible with the digital screen in use.

Optionally, some of the parts (i.e. slices) 501-512 may be based on color combinations that are halfway between those hue values, say half tones, as known in the art.

Thus, each slice 501-512 in the predefined radial pattern 5000 is designed with a respective, predefined color, and a respective, predefined position within the pattern.

Alternatively or additionally, the color selection made with respect to the slices 501-512 of the exemplary radial pattern 5000, may similarly take into consideration the wavelengths at which the sensitivity graphs of the image capture device (say a digital camera) peak, as described in further detail hereinabove.

The exemplary radial pattern 5000 further includes a marking 550 which extends from the central area 500 of the pattern 5000 on which a cross forming a first end of the mark is shown in FIG. 5, to the right.

The marking 550 may be used for automatically identifying the orientation of the pattern 5000 when captured 210 at least partially through the lens, guide the user in aligning the pattern 5000 in a specific orientation, etc., as described in further detail hereinbelow.

Further, the marking 550 reveals the location of each specific one of the parts 501-512, since the order of placement of the specific part in the pattern 5000, with respect to the marking 550 is known.

Consequently, the marking 550 allows an analysis 220 of the pattern 5000 when captured 210 in the image, say by comparing a color of each one of the parts 501-512 as captured 210 in the image and the color selection for that part (say by comparing hue values measured over the part and hue values calculated based on the color selection for the part). Similarly, the marking 550 allows an analysis 220 of the pattern 5000 as captured 210 in the image, by comparing between each part's 501-512 part captured 210 through the lens and the part's 501-512 part captured directly, taking into consideration the color that the part is designed with, as described in further detail hereinabove.

With reference being made back to FIG. 2A, it is noted that the background object (say the predefined pattern—whether that of FIG. 5 that of FIG. 6, or say other predefined pattern), may be designed in various ways.

For example, the predefined pattern may be colored, non-colored (say white or grayscale), or rather a one that has one or more colored parts and one or more noncolored (say grayscale or white) parts, as described in further detail hereinabove Optionally, the predefined pattern may be blank, non-blank (say a one with graphical or textual content), or rather a one that has one or more blank parts and one or more non-blank parts.

Optionally, the predefined pattern includes two or more parts of different color, color level (say gray level) or texture, and each part has a respective, predefined color, color level or texture, and a respective, predefined position within the pattern.

Consequently, the analysis 220 of the captured 210 image may be based on the color, color level or texture of at least one of the parts, and on the part's position within the background object.

In one example, the background object is a radial predefined pattern that has two or more parts of different color, arranged around a center of the predefined pattern, as describe in further detail hereinabove, and as illustrated, for example, in FIG. 5.

In the example, each part has respective, predefined color and order of placement around the center, and the analysis 220 of the captured 210 images is based on the respective predefined order of placement of at least one of the parts, and on the part's color, say through the comparisons described in further detail hereinabove.

Optionally, the background object includes one or more predefined markings.

In one example, when the background object aligns in a preferred orientation, the marking aligns in a predefined way. For example, when the exemplary pattern 5000 illustrated in FIG. 5 aligns in a preferred orientation, the marking 550 extends rightward from the center of the radial pattern 5000, as illustrated in FIG. 5.

In other cases, the markings, may include, for example a number, an arrow, a cross, a line, words, letters, etc., as described in further detail hereinbelow.

Thus, in a second example, illustrated with reference being made to FIG. 6 which is a simplified diagram schematically illustrating a first exemplary planar predefined pattern, according to an exemplary embodiment of the present invention, the marking includes a cross mark 610 that is adjacent to one of pattern's 6000 angles.

Returning to FIG. 2A, it is noted that one or more of the markings may be used by a user to align the pair of eyeglasses and the image capture device used to capture 210 the background object in the image, such that the captured 210 object aligns in a predefined way, as described in further detail hereinbelow.

Additionally or alternatively, the markings may be automatically identified and located in the captured 210 image, say using the flood-fill algorithm, as known in the art. Once identified and located, the located markings may be used to automatically identify an orientation of the background object, identify the object's center, etc., as described in further detail hereinbelow.

Optionally, the background object is a pattern predefined with a texture made of stripes, geometric shapes, etc., and the background object's orientation may rather be identified based on a directional aspect of the texture of the predefined pattern.

Thus, in one example, illustrated with reference being made to FIG. 7 which is a simplified diagram schematically illustrating a second exemplary planar predefined pattern 7000, according to an exemplary embodiment of the present invention, the orientation of the pattern 7000 may be identified based on the orientation of the stripes 710.

Further, the user himself may use the texture's directional aspect, for aligning the eyeglasses in a predefined, preferred orientation with respect to the image capture device, say into a position in which the pattern 7000 is captured 210 partially through the lens and partially directly, with the stripes 710 aligned vertically.

Returning to FIG. 2A, it is noted that optionally, an identifying of the background object's orientation, center, or both, is used for analyzing 220 the captured 210 image, for guiding the user in aligning the eyeglasses and image capture device (say by moving his mobile phone) in a specific orientation with respect to each other, etc., as described in further detail hereinbelow.

Thus, optionally, the method further includes locating a predefined marking which appears on the background object (say predefined pattern) as captured 210 in the image, and when identifying alignment of the predefined marking in a predefined orientation, automatically initiating the analyzing 220.

Optionally, the method further includes locating a predefined part of the background object, say the round area 550 around the radial pattern's 5000 center as illustrated in FIG. 5, and automatically initiating the analyzing 220 upon a predefined alignment of the part—say a positioning over a predefined area of the lens, etc.

Figure 8:
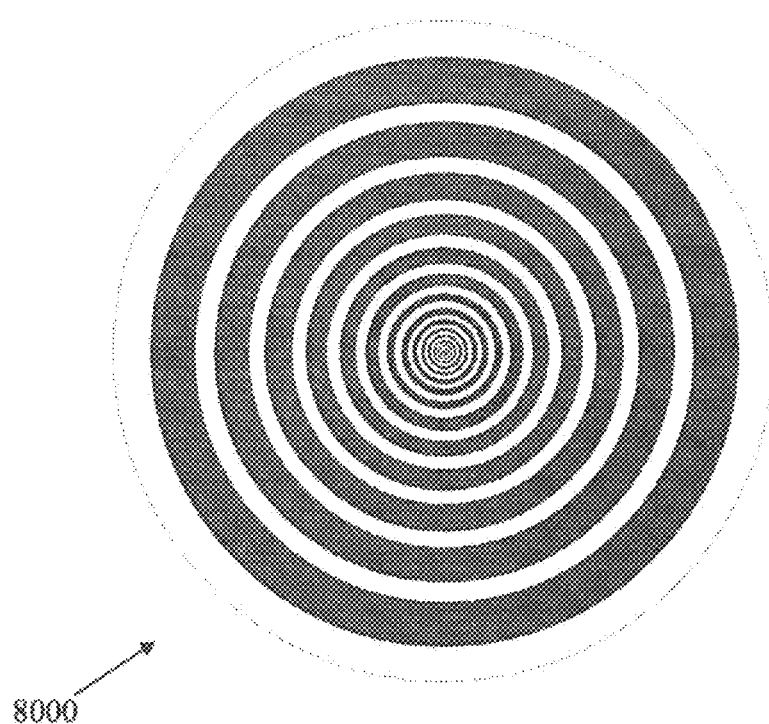
FIG. 8 is a simplified diagram schematically illustrating a second exemplary radial predefined pattern, according to an exemplary embodiment of the present invention.

Reference being now made to FIG. 8, which is a simplified diagram schematically illustrating a second exemplary radial predefined pattern, according to an exemplary embodiment of the present invention.

In one example, the analysis 220 is initiated upon identified alignment of a black and white pattern 8000 as captured 210 in the image in a preferred orientation as predefined, say by an operator or programmer of apparatus 1000.

In the example, the predefined orientation is a one in which the pattern's 8000 center as captured 210 is within a predefined distance from the center of the lens, as described in further detail hereinbelow.

Optionally, only upon identifying the alignment in the predefined, preferred orientation is the analyzing 220 initiated.

Figure 9:
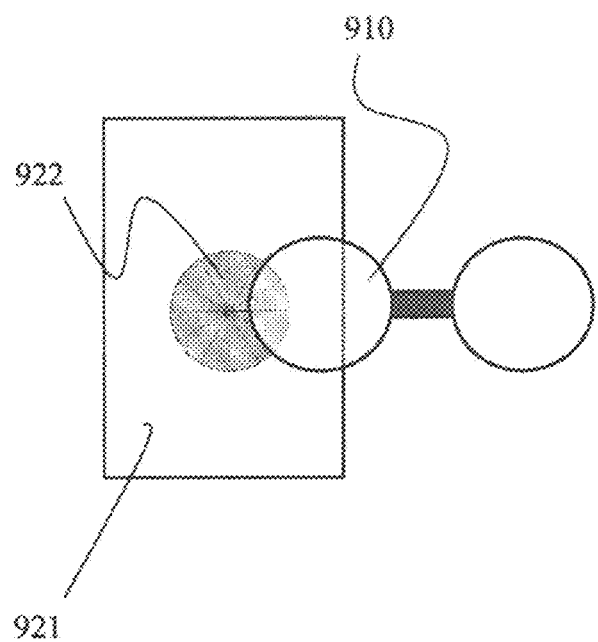
FIG. 9 is a simplified diagram schematically illustrating an exemplary scenario of testing of eyeglasses using a background object, according to an exemplary embodiment of the present invention.

Reference is now made to FIG. 9 which is a simplified diagram schematically illustrating an exemplary scenario of testing of eyeglasses using a background object, according to an exemplary embodiment of the present invention.

In one example, as a user moves a mobile phone over a pair of eyeglasses 910 placed on a surface (say a desktop), in a position opposite a computer screen 921.

As the user moves the mobile phone over the eyeglasses 910, a predefined pattern 922 (which is the background object of the example) is presented on the computer screen 921, and the apparatus 1000 (say the iPhone™ App using the mobile phone's camera) continuously captures 210 images of the pattern 922.

Then, the predefined pattern 922 is captured 210 in one of the images, partially through one of the eyeglasses' 910 lenses.

The capturing 210 of the predefined pattern 922 is triggered upon the user's pushing a certain button on the mobile phone, or rather automatically upon alignment of the phone's camera and the eyeglasses 910 in a predefined orientation with respect to each other, as described in further detail hereinbelow.

As captured 210 in the image, the lens covers only a part of the predefined pattern (i.e. background object of the example) 922.

Consequently, only a part of the predefined pattern 922 is captured 210 through the lens, and the remaining part of the predefined pattern 922 is captured 210 directly—i.e. not through the lens, as described in further detail hereinbelow.

Then, the image is analyzed 220, say through one or more comparisons made between the predefined pattern's 922 part that is captured 210 in the image through the lens and the predefined pattern's 922 part that is also captured 210 in the image, but not through the lens.

Finally, based on the analysis 220 of the image, there may be identified 230 a property of the lens—say the presence of a feature such as a filter or a layer for protection against UV (Ultraviolet) light or HEV (High-Energy Visible) light, a Driving Compatibility, or the presence of a defects such as scratches, peeling, cracks, etc.

Further, in the example, the orientation of a predefined marking which appears on the pattern 922 as captured 210 through the lens reveals the pattern's 922 orientation. When the marking aligns in a predefined orientation, there is identified the pattern's 922 alignment in a predefined, preferred orientation.

For example, the pattern may be similar to the pattern 5000 illustrated in FIG. 5, and the orientation of the marking 550 may be a one in which the marking 550 extends horizontally from the center of the pattern 500 to the right as illustrated in FIG. 5.

Thus, in the example, when there is determined that the marking 550 aligns in the orientation illustrated in FIG. 5, say using the known in the art flood-fill algorithm, there is determined that the pattern 922 as captured 210 in the image, aligns in the predefined, preferred orientation.

In the example, based on the pattern's alignment is the preferred orientation, there is further determined that the pattern 922 and image capture device used to capture the pattern in the image (say mobile phone camera), align in predefined orientation with respect to each other, as described in further detail hereinbelow.

Based on determining that the pattern 922 and image capture device used to capture the pattern in the image align in predefined orientation with respect to each other, the last image captured 210 by the phone's video camera is forwarded for the analysis 220. The forwarding initiates the analysis step 220 as described in further detail hereinabove.

Returning to FIG. 2A, it is noted that the marking, the part known to mark the background object's (say predefined pattern's) center, or both, may be located in the image using image processing or machine learning methods, as known in the art.

The image processing methods may include, but are not limited to: Pattern Matching, Dangman Integro-Differential Operators, Hough Transformation for circle detection, etc., as known in the art.

Optionally, the identifying of the alignment of the marking which appears on the background object in the predefined orientation may be carried out automatically.

For example, the identifying may be carried out using the Flood-Fill algorithm, or using OCR (Optical Character Recognition)—say for identifying a mark such as an arrow that appears on the background object and points up or the word 'Left' when printed on the background object.

Thus, optionally, the center of the background object, the orientation of the background object, or both, may be identified automatically, as described in further detail hereinabove.

Additionally or alternatively, the center of the background object, the orientation of the background object, or both, may be identified manually by the user, say through a GUI (Graphical User Interface) that allows the user to manually mark the center or orientation, as described in further detail hereinbelow.

Thus, in one example, real time video images of the background object as captured using the image capture device (say a video camera) of the user's mobile phone or tablet computer, is presented on a touch screen of the tablet computer or phone.

In the example, simultaneously to presentation of the video images, the user is allowed to mark the background object's center by touching the screen, mark an orientation of the object using a multi-touch gesture in which the user moves two fingers in a predefined way while touching the screen, etc., as known in the art of multi-touch gesture recognition.

Subsequently to the marking by the user or the automatic identifying of the center, alignment, or both the center and the alignment, the captured 210 images may be analyzed 220, and one or more properties of the lens may be identified 230 (say by the property identifier 130), as described in further detail hereinabove.

Optionally, the method further includes locating a facial feature (say a pupil, nose, etc.) in the captured 210 one or more images and using the located facial feature in further steps of the analysis 220.

In one example, the background object is a face of human being and the analyzing 220 includes using a size of the pupil, nose or other facial feature located in the captured 210 image, for estimating the location of a point of discontinuity on the lens. For example, the location of the point may be estimated by multiplying the distance of the point from a screw that connects the lens to the eyeglasses' bridge in the captured 210 image by a ratio. The ratio is calculated by dividing a known real world size of the facial feature (say a typical size of an adult's pupil) by the size of the face feature in the captured 210 image.

Optionally, the located facial feature may be used for guiding the user in aligning the image capture device and the eyeglasses in a preferred position—say in a specific orientation with respect to each other, as described in further detail hereinbelow.

Thus, in one example, the user is guided to move his mobile phone over the lens. with the phone's camera facing the eyeglasses, to the right, to the left, etc. The user is guided that way, until the face is captured 210 partially through the lens and partially directly, with the face's nose captured 210 within a predefined distance from the estimated center of the lens, as described in further detail hereinbelow.

The user may be guided for example, using vocal instructions given on the mobile phone's speaker, using a GUI implemented using titles with instructions, arrows, etc. or other cues that appear on the video images captured and presented on the phone's screen as the user moves the mobile phone over the eyeglasses, etc.

Optionally, the method further includes applying OCR (Optical Character Recognition) in areas along the located boundary, in order to identify lens index data that some manufacturers occasionally mark lens or frames with, say using a laser beam, as known in the art.

Optionally, the method further includes estimating location of the lens center in the captured 210 image.

For example, the estimating may be based on a mass center of the lens as calculated based on the location of the one or more boundaries, on intersection of a virtual vertical line positioned where the height of the lens is maximal with a virtual horizontal line positioned where the width of the lens is maximal, etc., or any combination thereof. The horizontality and verticality of the lines may be selected, for example, so as to be parallel to the horizontal side and vertical side of a smallest rectangle that would bound the located boundaries of the lens, as known in the art.

Optionally, the estimated location of the lens center may be used in analyzing 220 the captured 210 image, say for limiting the analysis 220 to a predefined central area of the lens.

Optionally, the estimated location of the lens center is used for guiding the user in aligning the image capture device and eyeglasses with respect to each other, in a predefined orientation in which a specific part of the background object is captured 210 partially through the lens and partially directly (i.e. not through the lens).

Optionally, the method further includes automatically locating a center of the background object, and using the located center in further steps of the analysis 220, as described in further detail hereinbelow.

Optionally, the located background object's center is used for guiding the user in aligning the image capture device and eyeglasses with respect to each other, say in a predefined, preferred orientation in which the background object's center is capture 210 through a preferable area of the lens, as described in further detail hereinbelow.

Thus, in one example, a GUI implemented using live video images captured 210 by the user's mobile phone video camera as the user moves the mobile phone over the eyeglasses, presents the captured 210 video images to the user in real time, as the user moves the mobile phone over the eyeglasses.

In the example, when the located center of the background object and the estimated location of the lens center—as captured 210 in the video images, are close enough, say within a predefined distance from each other (say a distance of less than 1% of the width of each one of the video images), the lens edges are colored green. However, when the located center of the background object and the estimated location of the lens—as captured in the video images, are not close enough, the lens edges are colored red.

Further in the example, when the edges are colored green, the last image captured 210 by the phone's video camera is forwarded for analysis 220, thus initiating the analysis step 220. However, when the edges are colored red, an arrow presented on the phone's screen, guides the user to move the phone or eyeglasses in a direction necessary for aligning the phone's video camera and the eyeglasses in a preferred orientation with respect to each other.

Optionally, the exemplary method further includes using face detection methods applied on the video images—say for identifying that a human face serving as the background object is captured 210 at least partially through the lens, and for identifying facial features thereof, as described in further detail hereinabove.

The face and facial features my be located in the captured using segmentation methods and/or tracking methods, which methods may also be used for automatically locating the eyeglasses, lens, etc.

Thus in a first example, the Viola-Jones cascade object detection algorithm and/or one or more other face detection methods, are applied on the video images captured 210 by the mobile phone or other computer, for locating the face and for identifying one or more facial features, as known in the art.

In a second example, since human eyes are located on the upper half of the face, the image's region of interest (ROI) in which the eyes appear, may be located using the Viola-Jones cascade object detection algorithm, an eye corner detection method, a glint detection method, a pupil detection method, etc., as known in the art.

Optionally, in order to reduce computational complexity, the exemplary method further uses known in the art video tracking methods.

For example, the method may include updating the ROI in which the eyes appear according to head and eye movements as captured 210 in the image.

Optionally, one or more of the above mentioned Viola Jones, face detection, segmentation, and tracking methods are further used to guide the user with the GUI, as described in further detail hereinabove.

For example, the methods may be used for locating the lens boundaries, lens and background object centers, face features, etc., and based on that locating, to guide the user to move and align the image capture device and eyeglasses into a predefined orientation with respect to each other, as described in further detail hereinabove.

Optionally, in the method, there is further identified 230 an assembly quality of the eyeglasses based on the analysis 220 (say the analysis 220 by the image analyzer 120), as descried in further detail hereinabove.

For example, when the eyeglasses quality of assembly is low, pressure applied on the lens by the eyeglass frame may have an effect on light transmittance in lens areas affected by the pressure. The areas affected by the pressure are thus expected to differ in their light transmittance when compared to light transmittance through parts of the lens that are not affected by the pressure.

In one example, as a part of the analysis 220 there is identified that certain lens areas along the boundaries of the lens as identified (say by the orientation determiner) appear to have mean RGB channel intensity values that deviate significantly (say in more than 10%) from RGB channel intensity values of the lens' other areas.

Since lenses are typically engaged by the eyeglass frame along parts of the lens boundaries, there may thus be identified 230 an assembly quality of the eyeglasses based on that analysis 220.

Thus, in one example, when the deviation of the RGB channel intensity values is lower than a reference value (say a threshold of 10%) as predefined by a user or programmer of apparatus 1000, there is determined that the quality of assembly is high.

However, in the example, when the deviation of the RGB channel intensity values in certain areas along the identified boundaries is higher than the reference value (say the threshold), there is determined that there is a problem in the quality of assembly.

Optionally, the property identifier 130 further shows the parts of the frame that may have assembly problems to the user, using a GUI, say by marking the parts of the lens boundaries along which the deviation of the RGB channel intensity values is higher than the reference value, in red color.

Figure 2B:
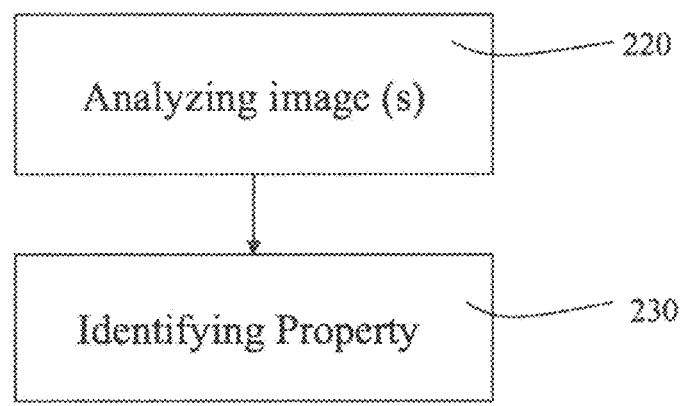
FIG. 2B is a flowchart illustrating a second exemplary computer implemented method for testing of eyeglasses using a background object, according to an exemplary embodiment of the present invention.

Reference is now made to FIG. 2B, which is a flowchart illustrating a second exemplary computer implemented method for testing of eyeglasses using a background object, according to an exemplary embodiment of the present invention.

An exemplary method for testing of eyeglasses using a background object eyeglasses, according to an exemplary embodiment of the present invention, is implemented on a computer.

The computer may actually include one or more computers, such as a smart phone, a table computer or another computer—in use by a user, a server computer in communication with the computer in use by the user, another example, etc. or any combination thereof.

The exemplary method may be implemented by programming the computer, say by uploading computer executable instructions from a computer readable medium, etc., as known in the art.

In a first example, the whole steps of analyzing 220 and identifying 230, as described in further detail hereinabove, are carried out on a first computer (say the server computer).

In a second example, the first computer rather communicates with a second computer, say a remote computer (say a mobile phone or another computer), for carrying out one or more parts of the method steps. Thus, in the second example, at least a part of the below described steps of analyzing 220 and identifying 230, is carried out on the second computer.

Thus, the second exemplary method includes the steps of analyzing 220 one or more captured images and identifying 230 at least one property of a lens, using one or more of the one or more captured images, as described in further detail for the first exemplary method hereinabove.

Optionally, the second exemplary method further includes a step (not shown) of receiving one or more images in which a background object is captured at least partially through the lens, say from a computer such as a mobile phone or a tablet computer, as described in further detail the first method, hereinabove.

In one example, at least a part of the background object is captured in the image through a lens of a pair of eyeglasses.

Optionally, one or more remaining parts (if any) of the background object are also captured 210 in the image, but rather directly—i.e. not through the lens, as described in further detail hereinbelow, and as illustrated, for example, in FIG. 9.

The one or more images may be received, for example, over the internet, an intranet network, a LAN (Local Area Network), a wireless network, another communication network or channel, or any combination thereof, as known in the art.

Optionally, the second method further includes one or more additional steps as described in further detail for the first method hereinabove.

For example, the second method may include the capturing of the one or more images, identifying of one or more facial features, guiding the user, identifying orientation, etc., or any combination thereof, each of which steps may be implemented on the first computer, second computer, or both.

Optionally, in the second method, the step of capturing is carried out on the first computer, say by remotely controlling an image capture device (say a mobile 5 phone camera) in use by the user, for capturing the one or more images, as described in further detail hereinabove.

Figure 10A:
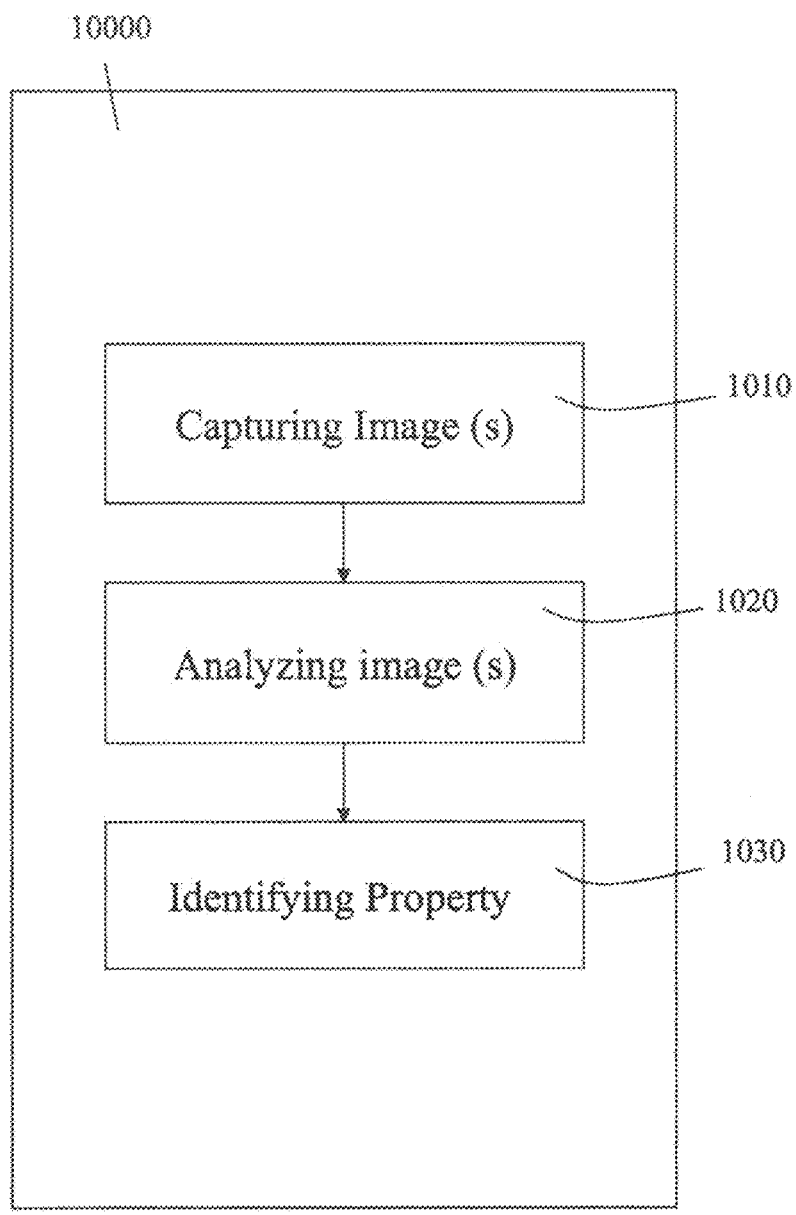
FIG. 10A is a block diagram schematically illustrating a first exemplary computer readable medium storing computer executable instructions for preforming steps of testing of eyeglasses using a background object, according to an exemplary embodiment of the present invention.

Reference is now made to FIG. 10A, which is a block diagram schematically illustrating a first exemplary computer readable medium storing computer executable instructions for performing steps of testing of eyeglasses using a background object, according to an exemplary embodiment of the present invention.

According to an exemplary embodiment of the present invention, there is provided a non-transitory computer readable medium 10000 which stores computer executable instruction for performing steps of testing of eyeglasses using a background object.

The computer readable medium 10000 may include, but is not limited to: a RAM (Rapid Access Memory), a DRAM (Dynamic RAM), a ROM (Read Only Memory), a PROM (Programmable ROM), a Solid State Drive (SSD), a USB-Memory, a Hard Disk Drive (HDD), etc., as known in the art.

The computer readable medium 10000 stores computer executable instructions, for performing steps of the first exemplary method for testing of eyeglasses using a background object, as described in further detail hereinabove and as illustrated using FIG. 2A.

For example, the medium 10000 stores computer executable instructions 1010 for performing the capturing 210 step of the method, computer executable instructions 1020 for performing the analyzing 220 step of the method, and computer executable instructions 1030 for performing the property identifying 230 step of the method.

The instructions may be executed upon one or more computer processors of a computer in use by the user for testing the user's eyeglasses, on a remote computer in communication with the computer in use by the user (say a remote server computer), on another computer, etc., or any combination thereof, as described in further detail hereinabove.

The computer used by the user may be for example, a smart phone (say an Apple® iPhone or a Samsung® Galaxy cellular phone), a tablet computer (say an Apple® iPad), etc.

In one example, the instructions are in a form of a computer application such an iPhone® App, which may be downloaded to a mobile phone (say an Apple® iPhone), stored on the computer readable medium 10000 (say on the phone's ROM), and executed on the mobile phone's processor.

Figure 10B:
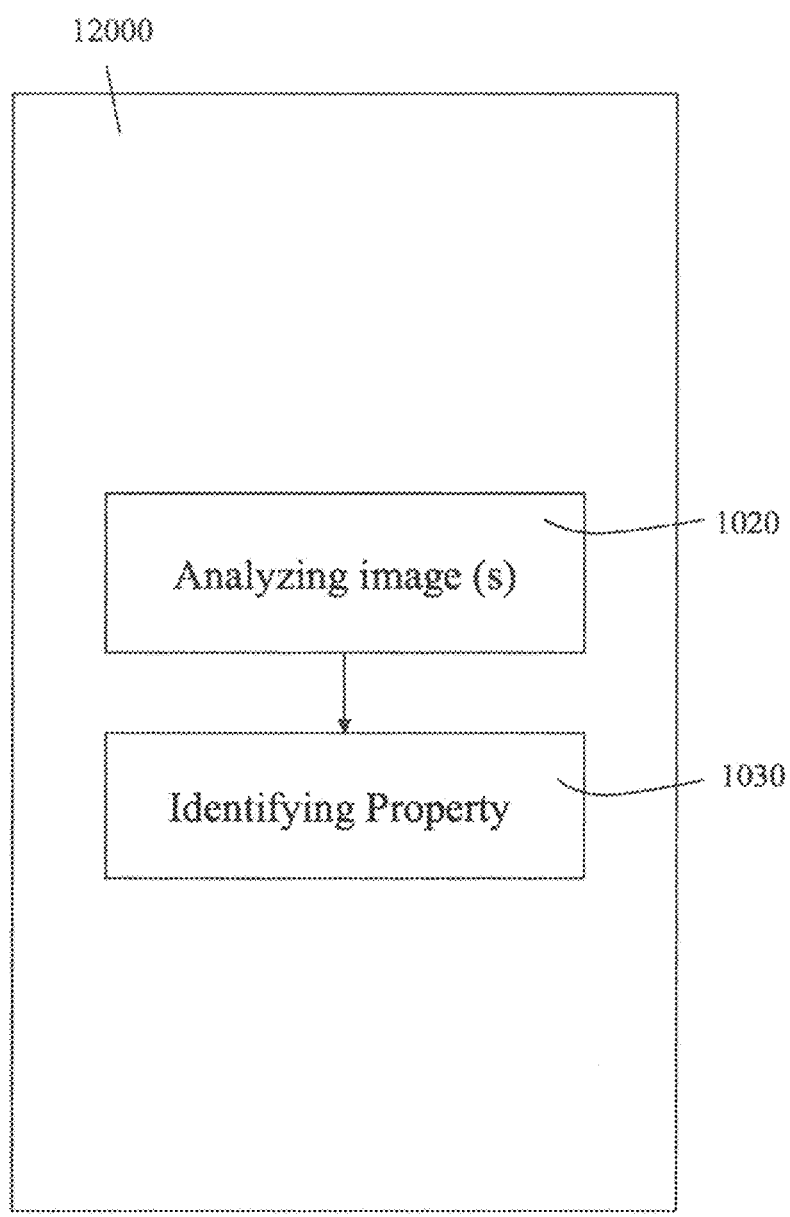
FIG. 10B is a block diagram schematically illustrating a second exemplary computer readable medium storing computer executable instructions for performing steps of testing of eyeglasses using a background object, according to an exemplary embodiment of the present invention.

Reference is now made to FIG. 10B which is a block diagram schematically illustrating a second exemplary computer readable medium storing computer executable instructions for performing steps of testing of eyeglasses using a background object, according to an exemplary embodiment of the present invention.

According to an exemplary embodiment of the present invention, there is provided a non-transitory computer readable medium 12000 which stores computer executable instructions for performing steps of testing of eyeglasses using a background object, The computer readable medium 12000 may include, but is not limited to: a RAM (Rapid Access Memory), a DRAM (Dynamic RAM), a ROM (Read Only Memory), a PROM (Programmable ROM), an EPROM (Erasable ROM), a Micro SD (Secure Digital) Card, a CD-ROM, a Solid State Drive (SSD), a USB-Memory, a Hard Disk Drive (HDD), etc., as known in the art.

For example, the medium 12000 stores computer executable instructions 1020 for performing the analyzing 220 step of the method, and computer executable instructions 1030 for performing the property identifying 230 step of the method.

The computer readable medium 12000 stores computer executable instructions, for performing steps of the second exemplary method for testing of eyeglasses using a background object, as described in further detail hereinabove and illustrated using FIG. 2B.

The instructions may be executed on one or more computer processors of one or more first computers—say on a server computer, on a remote computer in communication with the first computer (say the server computer), on another computer, or any combination thereof, as described in further detail hereinabove.

For example, the instructions may be in a form of a computer application which may be downloaded to the computer, say to a smart phone (say Apple® iPhone), stored on the computer readable medium 12000, and executed on the one or more processors It is expected that during the life of this patent many relevant devices and systems will be developed and the scope of the terms herein, particularly of the terms "Lens", "Eyeglasses", "Spectrometer", "Laser", "Computer", "Tablet Computer", "Mobile Phone", "Smart Phone", "Screen", "Camera", "LCD", "CCD", and "CMOS", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for determining one or more properties of an eyeglasses lens, the method comprising:
    obtaining an image of a background object, wherein in a first part of the image a first part of the background object is captured as viewed through the eyeglasses lens and in a second part of the same image, a second part of the background object is captured as viewed directly; and
    analyzing said image by comparing the first and second parts of the background object being captured, respectively, as viewed through the eyeglasses lens and as viewed directly; and
    identifying the one or more properties of the eyeglasses lens based on a difference between appearance, in said image, of the first and second parts of the background object viewed, respectively, through the eyeglasses lens and directly.

2. The method of claim 1, wherein the analyzing comprises analyzing a color characteristic of the image by comparing a color characteristic between said first and second parts of the background object captured in the image, as viewed, respectively, through the eyeglasses lens and directly, and thereby identifying said one or more properties associated with at least one of a predefined coating and a predefined filter.

3. The method of claim 1, wherein the one or more properties pertain to at least one of spectral filtering properties and a driving compatibility of the lens.

4. The method of claim 1, wherein the one or more properties pertain to opacity of the lens.

5. The method of claim 1, further comprising identifying an assembly quality of the eyeglasses based on the analysis.

6. The method of claim 1, wherein the analyzing further comprises analyzing image sharpness by carrying out at least one of the following: processing image of at least the first part of the background object viewed through the eyeglasses lens to determine sharpness level of said image of at least the first part in relation to a predetermined threshold; and processing image of the first and second parts of the background object captured as viewed, respectively, through the eyeglasses lens and directly, to determine a difference between sharpness levels of the image of the first and second parts of the background object in relation to a predetermined threshold.

7. The method of claim 1, further comprising identifying a predefined deformation along a segment within the background object as captured in the image.

8. The method of a claim 1, further comprising optimizing color selection for at least a part of the background object according to technical characteristics of an image capture device intended to be used for capturing the image, a device intended to be used for presenting the background object, or of both of the devices.

9. The method of claim 1, wherein the background object comprises a plurality of parts, each part having a respective, predefined color and a respective, predefined position within the background object, and the analyzing is based on the respective predefined color and position of at least one of the parts.

10. The method of claim 1, wherein the background object comprises a plurality of parts arranged around a center of the background object, each part having a respective, predefined color and a respective, predefined order of placement around the center, and the analyzing is based on the respective predefined order of placement and color of at least one of the parts.

11. The method of claim 1, further comprising automatically identifying an orientation of the background object as captured in the image.

12. The method of claim 11, wherein said automatically identifying of the orientation of the background object captured in the image comprises using a directional aspect of a texture of the background object as captured in the image.

13. The method of claim 11, further comprising automatically initiating the analyzing of said at least part of the object, upon identifying alignment of the background object as captured in the image in a predefined orientation.

14. The method of claim 1, further comprising guiding a user in aligning the pair of eyeglasses and an image capture device used to capture the image with respect to each other.

15. The method of claim 14, further comprising at least one of the following:
    locating a facial feature in the captured image, and using the located facial feature for said guiding of the user;
    identifying alignment of the background object as captured in the image, and using the identified alignment for said guiding of the user
    locating a boundary of the lens in the image, and using the located boundary for said guiding of the user;
    automatically estimating a location of a center of the lens of the eyeglasses in the image, and using the estimated location for said guiding of the user.

16. The method of claim 1, further comprising locating a boundary of the lens in the image.

17. The method of claim 16, further comprising verifying that the background object as captured in the image extends over two sides of the boundary.

18. The method of claim 1, further comprising automatically estimating a location of a center of the lens of the eyeglasses in the image.

19. A system for testing of eyeglasses using a background object, the system comprising:
- a reference object image provider configured and operable for obtaining an image of a background object, wherein in said image a first part of the background object is captured as viewed through a lens of the pair of eyeglasses and in the same image a second part of the background object is captured as viewed directly;
- an image analyzer configured to analyze the image of the background object to determine said part of the image in which said first part of the background object is captured as viewed through the lens of the eyeglasses and said part of the same image in which the second part of the background object is captured as viewed directly; and
- a property identifier, in communication with the image analyzer, configured to compare the first and second parts of the background object as captured in said image and identify the one or more properties of the eyeglasses lens based on a difference between appearance, in said image, of the first and second parts of the background object viewed, respectively, through the lens and directly.

20. A non-transitory computer readable medium storing computer executable instructions for performing steps of testing of eyeglasses using a background object, the steps comprising:
- obtaining an image of a background object, wherein in a first part of the image a first part of the background object is captured as viewed through a lens of a pair of eyeglasses and, in a second part of the same image, a second part of the background object is captured as viewed directly; and
- analyzing said image by comparing the first and second parts of the background object being captured, respectively, as viewed through the eyeglasses lens and as viewed directly; and
- identifying the one or more properties of the eyeglasses lens based on a difference between appearance, in said at least part of the image, of the first and second parts of the background object viewed, respectively, through the lens and directly.

* * * * *